United States Patent
Endo et al.

(10) Patent No.: US 8,830,384 B2
(45) Date of Patent: Sep. 9, 2014

(54) IMAGING DEVICE AND IMAGING METHOD

(71) Applicant: FUJIFILM Corporation, Tokyo (JP)

(72) Inventors: Hiroshi Endo, Saitama (JP); Tomoyuki Kawai, Saitama (JP); Tomoki Inoue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/063,799

(22) Filed: Oct. 25, 2013

(65) Prior Publication Data
US 2014/0049668 A1 Feb. 20, 2014

Related U.S. Application Data

(63) Continuation of application No. PCT/JP2012/059909, filed on Apr. 11, 2012.

(30) Foreign Application Priority Data

Apr. 28, 2011 (JP) .................................. 2011-102274

(51) Int. Cl.

| | |
|---|---|
| G03B 13/00 | (2006.01) |
| H04N 5/232 | (2006.01) |
| H04N 5/228 | (2006.01) |
| H04N 3/14 | (2006.01) |
| H04N 5/335 | (2011.01) |
| H04N 9/04 | (2006.01) |
| H01L 27/00 | (2006.01) |
| H04N 9/077 | (2006.01) |
| H04N 5/376 | (2011.01) |
| H04N 5/345 | (2011.01) |
| H04N 5/369 | (2011.01) |
| H04N 5/347 | (2011.01) |
| H04N 101/00 | (2006.01) |

(52) U.S. Cl.
CPC .......... *H04N 5/23212* (2013.01); *H04N 9/077* (2013.01); *H04N 9/045* (2013.01); *H04N 5/376* (2013.01); *H04N 5/3456* (2013.01); *H04N 2101/00* (2013.01); *H04N 5/3696* (2013.01); *H04N 5/347* (2013.01)
USPC ........ 348/354; 348/222.1; 348/272; 348/273; 348/345; 348/349; 250/208.1

(58) Field of Classification Search
USPC ..................... 348/222.1, 266–283, 294–324, 348/345–356; 250/208.1
See application file for complete search history.

(56) References Cited

U.S. PATENT DOCUMENTS 7,095,441 B2 * 8/2006 Nagano ........................ 348/308

(Continued)

FOREIGN PATENT DOCUMENTS

JP 2009-60597 A 3/2009

(Continued)

OTHER PUBLICATIONS

International Search Report issued in PCT/JP2012/059909 mailed May 15, 2012.

(Continued)

*Primary Examiner* — Michael Osinski
(74) *Attorney, Agent, or Firm* — Birch, Stewart, Kolasch & Birch, LLP

(57) ABSTRACT

An imaging device includes a control unit provided to perform first control or second control on the same type of plural pixel rows as phase difference pixel rows which are arranged in parallel in a column direction at regular intervals, in which pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled, in the second control, a signal is read out from each pixel of the pixel row to be controlled, and the control unit performs the first control at least on the phase difference pixel rows.

16 Claims, 14 Drawing Sheets

(56) References Cited

U.S. PATENT DOCUMENTS

| | | | |
|---|---|---|---|
| 7,839,444 B2* | 11/2010 | Kuruma | 348/333.01 |
| 8,018,524 B2* | 9/2011 | Kawarada | 348/350 |
| 8,049,801 B2* | 11/2011 | Kusaka | 348/302 |
| 8,098,321 B2* | 1/2012 | Shimoda et al. | 348/349 |
| 8,218,017 B2* | 7/2012 | Matsuo et al. | 348/208.12 |
| 8,243,189 B2* | 8/2012 | Kusaka | 348/350 |
| 8,319,882 B2* | 11/2012 | Fujii et al. | 348/345 |
| 8,593,531 B2* | 11/2013 | Yamaguchi | 348/208.4 |
| 8,698,927 B2* | 4/2014 | Nagano | 348/294 |
| 2005/0270401 A1* | 12/2005 | Hatano | 348/335 |
| 2006/0209202 A1* | 9/2006 | Yanai | 348/311 |
| 2007/0222882 A1* | 9/2007 | Kobayashi | 348/311 |
| 2008/0088725 A1* | 4/2008 | Matsunaga | 348/302 |
| 2008/0259202 A1* | 10/2008 | Fujii | 348/345 |
| 2009/0135289 A1* | 5/2009 | Kusaka | 348/345 |
| 2009/0146046 A1* | 6/2009 | Katsuda et al. | 250/201.6 |
| 2009/0153720 A1* | 6/2009 | Suzuki et al. | 348/333.01 |
| 2009/0213255 A1* | 8/2009 | Suzuki | 348/345 |
| 2009/0278966 A1* | 11/2009 | Kusaka | 348/294 |
| 2010/0150538 A1* | 6/2010 | Ono et al. | 396/104 |
| 2010/0188522 A1* | 7/2010 | Ohnishi et al. | 348/222.1 |
| 2010/0214452 A1* | 8/2010 | Kawarada | 348/255 |
| 2010/0238343 A1* | 9/2010 | Kawarada | 348/345 |
| 2010/0302432 A1* | 12/2010 | Komuro | 348/340 |
| 2011/0063484 A1* | 3/2011 | Fujii et al. | 348/294 |
| 2011/0096189 A1* | 4/2011 | Taniguchi | 348/222.1 |
| 2011/0164165 A1* | 7/2011 | Hashimoto et al. | 348/340 |
| 2011/0267533 A1* | 11/2011 | Hirose | 348/345 |
| 2012/0057057 A1* | 3/2012 | Amano | 348/294 |
| 2012/0105688 A1* | 5/2012 | Kita | 348/242 |
| 2012/0127344 A1* | 5/2012 | Yanada et al. | 348/231.99 |
| 2012/0147238 A1* | 6/2012 | Kita et al. | 348/302 |
| 2012/0154637 A1* | 6/2012 | Hara | 348/239 |
| 2012/0176520 A1* | 7/2012 | Hara | 348/246 |
| 2012/0176532 A1* | 7/2012 | Hara | 348/352 |
| 2012/0188425 A1* | 7/2012 | Kita | 348/294 |
| 2012/0224087 A1* | 9/2012 | Hoda et al. | 348/247 |
| 2012/0320241 A1* | 12/2012 | Sugawara | 348/246 |
| 2013/0002936 A1* | 1/2013 | Hirama et al. | 348/349 |
| 2013/0063638 A1* | 3/2013 | Tanaka et al. | 348/302 |
| 2013/0107067 A1* | 5/2013 | Miyakoshi | 348/208.5 |
| 2014/0022422 A1* | 1/2014 | Endo et al. | 348/270 |
| 2014/0022614 A1* | 1/2014 | Endo et al. | 358/505 |
| 2014/0104465 A1* | 4/2014 | Yamashita | 348/280 |

FOREIGN PATENT DOCUMENTS

| | | |
|---|---|---|
| JP | 2010-152161 A | 7/2010 |
| JP | 2010-181751 A | 8/2010 |
| JP | 2010-185998 A | 8/2010 |
| JP | 2010-271670 A | 12/2010 |
| WO | WO 2009/020031 A1 | 2/2009 |
| WO | WO 2010/090056 A1 | 8/2010 |
| WO | WO 2010/137444 A1 | 12/2010 |

OTHER PUBLICATIONS

Written Opinion of the International Searching Authority issued in PCT/JP2012/059909 mailed May 15, 2012.

* cited by examiner

IMAGING DEVICE AND IMAGING METHOD

CROSS REFERENCE TO RELATED APPLICATION

This is a continuation of International Application No. PCT/JP2012/059909 filed on Apr. 11, 2012, and claims priority from Japanese Patent Application No. 2011-102274, filed on Apr. 28, 2011, the entire disclosures of which are incorporated herein by reference.

TECHNICAL FIELD

The present invention relates to an imaging device and an imaging method.

RELATED ART

Recently, a digital camera mounted with an imaging element including a phase difference pixel to detect a phase difference has been commercialized. The imaging element may perform auto-focusing by a phase difference detecting method which uses the phase difference pixel at high speed.

For example, Patent Literature 1 (JP-A-2010-152161) discloses an imaging element formed with pixel rows including phase difference pixels at intervals of a predetermined number of pixel rows on a light receiving surface on which a plurality of pixels is arranged.

When a moving image is captured in an imaging element which includes pixel rows including phase difference pixels at intervals of a predetermined number of pixel rows, if a signal read out from the phase difference pixel is included in a captured image signal output from the imaging element, it is difficult to correct the signal. Therefore, at the time of capturing the moving image, it is considered that thinning driving in which the signal is not read out from the pixel row which includes the phase difference pixel is effective.

However, in some arrangement patterns of the pixel rows which include the phase difference pixels, intervals of positions (spatial position) in a subject space of a signal obtained by the thinning driving become irregular, which may cause jaggies.

FIG. 13 is a diagram enlarging a part of a solid-state imaging element having a phase difference pixel. The solid-state imaging device 300 includes a plurality of pixels 100 which is arranged in a row direction X and a column direction Y orthogonal to the row direction in a square lattice shape.

Each pixel 100 includes a photoelectric conversion element and a color filter which is disposed above the photoelectric conversion element. The color filters included in all pixels 100 are arranged in a Bayer pattern.

In FIG. 13, a pixel with a reference symbol "R" is a pixel that detects red light. Further, a pixel with a reference symbol "G" is a pixel that detects green light. In addition, a pixel with a reference symbol "B" is a pixel that detects blue light. Hereinafter, a pixel 100 with a reference symbol R is also referred to as an R pixel 100. Further, a pixel 100 with a reference symbol G is also referred to as a G pixel 100. In addition, a pixel 100 with a reference symbol B is also referred to as a B pixel 100.

In the solid-state imaging element 300, some of the G pixels 100 serve as a phase difference pixel which is a pixel for detecting a phase difference. In FIG. 13, a shade and a reference symbol 100a are attached to the pixel 100 which serves as a phase difference pixel. The phase difference pixel 100a includes two types of pixels, that is, a pixel in which an optical opening of the photoelectric conversion element is eccentrically arranged at a right side and a pixel in which an optical opening of the photoelectric conversion element is eccentrically arranged at a left side.

In an example of FIG. 13, the pixel row including the phase difference pixel 100a is arranged at an interval of three pixel rows.

In the solid-state imaging element 300, two methods for obtaining signals (an R (red) signal, a G (green) signal, and a B (blue) signal) required to generate color image data without reading out the signal from the phase difference pixel 100a are considered as follows.

One of the methods is a method which does not read a signal from a pixel row including the phase difference pixel 100a and a GR pixel row consisting of the G pixels 100 and the R pixels 100 which is adjacent to the pixel row thereon but reads a signal only from the other pixel rows, as illustrated in FIG. 13.

The other method is a method that does not read a signal from a pixel row including the phase difference pixel 100a and a GR pixel row which is adjacent to the pixel row therebelow but reads a signal only from the other pixel rows, as illustrated in FIG. 14.

However, according to the above two methods, since spatial positions of the signals read out from the pixel 100 are irregularly arranged in parallel in the column direction Y, jaggies may occur.

Further, in the solid-state imaging element 300, if a driving method which alternately reads the GR pixel row and a BG pixel row consisting of the B pixels 100 and the G pixels 100, excepting the pixel row which includes the phase difference pixel 100a, in the column direction or at intervals of a predetermined number of pixel rows is adopted, the spatial positions of the signals read out from the solid-state imaging element 300 may be arranged in parallel in the column direction at regular intervals.

However, the solid-state imaging element 300 has the pixel row which includes the phase difference pixel 100a at an interval of three pixel rows so that the above-driving method may not be adopted. As a solid-state imaging element which does not adopt the above driving method, other than the solid-state imaging element 300, the pixel rows which include the phase difference pixels 100a are arranged at an interval of seven pixel rows in the solid-state imaging element 300 or the pixel rows which include the phase difference pixels 100a are arranged at an interval of 15 pixel rows in the solid-state imaging element 300.

That is, in the solid-state imaging element in which the pixel rows which include phase difference pixels are arranged at intervals of $(2^{n+1}-1)$ (n is a natural number) pixel rows, the arrangement of the spatial positions of the read signals is irregular in the thinning driving method known in the related art so that the jaggies may not be suppressed.

Patent Literature 1 does not disclose a specific thinning driving method which suppresses the jaggies.

SUMMARY OF INVENTION

Technical Problem

The present invention has been made in an effort to provide an imaging device and an imaging method which do not cause jaggies when a signal of a phase difference pixel is thinned to generate an image.

Solution to Problem

According to an aspect of the present invention, an imaging device, includes: a solid-state imaging element including a plurality of pixels which is two-dimensionally arranged, in which the solid-state imaging element includes a pixel group in which a red pixel that detects red light, a green pixel that detects green light, and a blue pixel that detects blue light are arranged in a Bayer pattern, in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction, the GR pixel rows or the BG pixel rows which are included in the pixel group arranged in the Bayer pattern include a plurality of phase difference pixel rows which includes phase difference pixels for detecting a phase difference, the phase difference pixel rows are arranged at an interval of $(2^{n+1}-1)$ (n is a natural number) in the pixel group arranged in the Beyer pattern, a control unit is provided to perform first control or second control on the same type of plural pixel rows as the phase difference pixel rows which are arranged in parallel in the column direction at regular intervals, pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled, in the second control, a signal is read out from each pixel of the pixel row to be controlled, the same type of plural pixel rows which are arranged in parallel in the column direction at the regular intervals include all phase difference pixel rows included in the solid-state imaging element and at least a pixel row which is in a middle between the phase difference pixel rows which are adjacent in the column direction, and the control unit performs the first control at least on the phase difference pixel rows.

According to another aspect of the present invention, an imaging method which uses a solid-state imaging element including a plurality of pixels which is two-dimensionally arranged, in which the solid-state imaging element includes a pixel group in which a red pixel that detects red light, a green pixel that detects green light, and a blue pixel that detects blue light are arranged in a Bayer pattern, in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction, the GR pixel rows or the BG pixel rows which are included in the pixel group arranged in the Beyer pattern includes a plurality of phase difference pixel rows which includes phase difference pixels for detecting a phase difference, the phase difference pixel rows are arranged at an interval of $(2^{n+1}-1)$ (n is a natural number) pixel rows in the pixel group arranged in the Beyer pattern, a control step which performs first control or second control on the same type of plural pixel rows as the phase difference pixel rows which are arranged in parallel in the column direction at regular intervals is provided, pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled, in the second control, a signal is read out from each pixel of the pixel row to be controlled, the same type of plural pixel rows which are arranged in the column direction at the regular intervals include all phase difference pixel rows included in the solid-state imaging element and at least a pixel row which is in a middle between the phase difference pixel rows which are adjacent in the column direction, and in the control step, the first control is performed at least on the phase difference pixel rows.

Advantageous Effects of Invention

According to the present invention, it is possible to provide an imaging device and an imaging method which do not cause jaggies when a signal of a phase difference pixel is thinned to generate an image.

DESCRIPTION OF EMBODIMENTS

Hereinafter, an embodiment of the present invention will be described with reference to the drawings.

Figure 1:
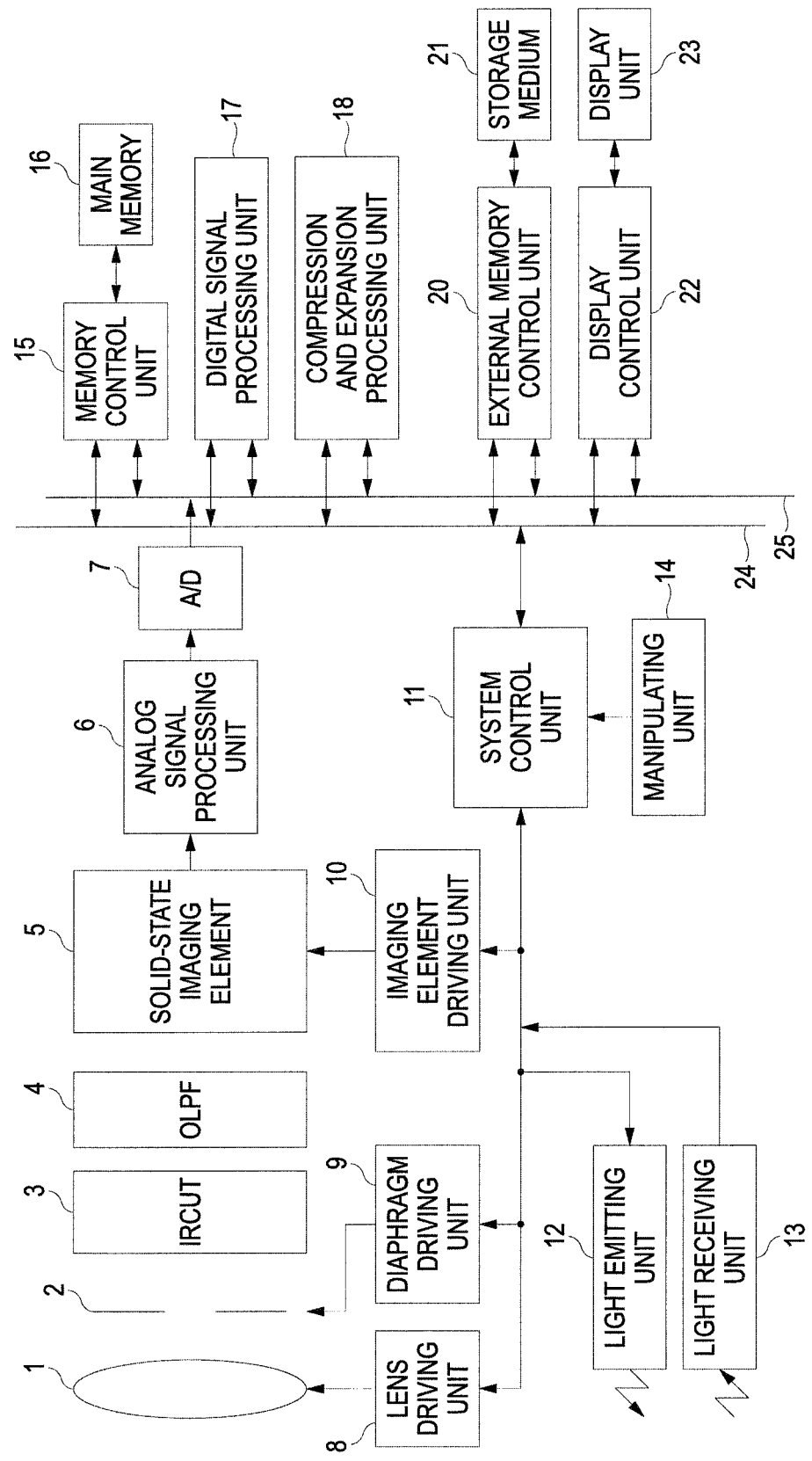
FIG. 1 is a diagram illustrating a schematic configuration of an imaging device for explaining an embodiment of the present invention.

FIG. 1 is a diagram illustrating a schematic configuration of an imaging device for explaining an embodiment of the present invention. Examples of the imaging device include an imaging device such as a digital camera and a digital video camera and an imaging module which is mounted in an electronic endoscope and a portable phone with a camera. Hereinafter, the digital camera will be described as an example.

An imaging system of a digital camera illustrated in FIG. 1 includes a photographing lens 1, an MOS type solid-state imaging element 5, a diaphragm 2 provided therebetween, an infrared cut filter 3, and an optical low pass filter 4.

A system control unit 11 which controls the entire electrical control system of the digital camera controls a flash light emitting unit 12 and a light receiving unit 13. Further, the system control unit 11 controls a lens driving unit 8 to adjust a position of the photographing lens 1 to a focus position or to perform zoom adjustment. In addition, the system control unit 11 controls an open amount of the diaphragm 2 through a diaphragm driving unit 9 to adjust an exposure amount.

Further, the system control unit 11 controls an imaging element driving unit 10 to drive the solid-state imaging element 5 to output a subject image captured through the photographing lens 1 as a captured image signal. An instruction signal from a user is input to the system control unit 11 through a manipulating unit 14.

The electrical control system of the digital camera includes an analog signal processing unit 6 which is connected to an output of the solid-state imaging element 5 to perform analog signal processing such as correlated double sampling processing and an A/D converting circuit 7 which converts a RGB color signal output from the analog signal processing unit 6 into a digital signal. The analog signal processing unit 6 and the A/D converting circuit 7 are controlled by the system control unit 11.

Moreover, the electrical control system of the digital camera includes a main memory 16, a memory control unit 15 which is connected to the main memory 16, a digital signal processing unit 17 which performs an interpolation operation, a gamma correction operation, and RGB/YC conversion processing to generate image data, a compression and expansion processing unit 18 which compresses the image data generated in the digital signal processing unit 17 in a JPEG format or expands the compressed image data, an external memory control unit 20 to which a detachable recording medium 21 is connected, and a display control unit 22 to which a liquid crystal display unit 23 mounted on a rear surface of a camera is connected.

The memory control unit 15, the digital signal processing unit 17, the compression and expansion processing unit 18, the external memory control unit 20, and the display control unit 22 are connected to each other by a control bus 24 and a data bus 25 to be controlled by a command from the system control unit 11.

Figure 2:
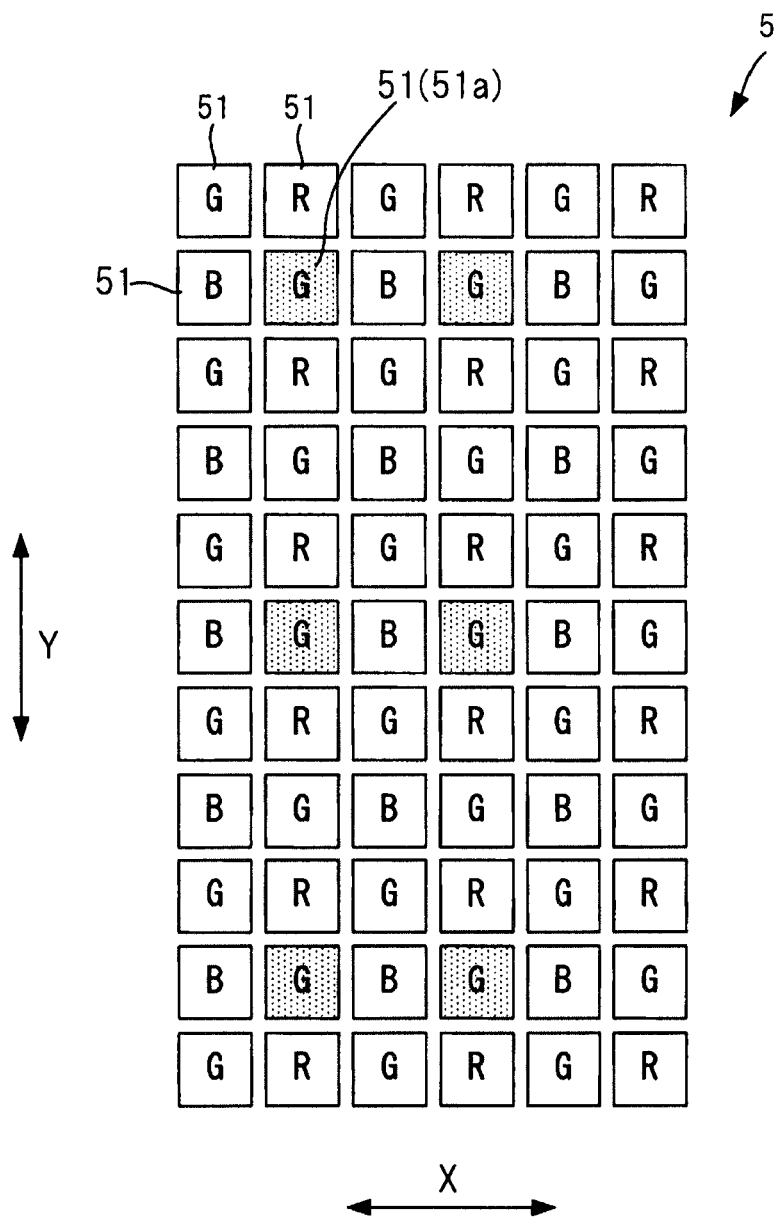
FIG. 2 is a plan schematic view illustrating a schematic configuration of a solid-state imaging element 5 illustrated in FIG. 1.

FIG. 2 is a plan schematic view illustrating a schematic configuration of the solid-state imaging element 5 illustrated in FIG. 1.

The solid-state imaging element 5 includes a plurality of pixels 51 which is two-dimensionally (in a square lattice shape in an example of FIG. 2) arranged in a row direction X and a column direction Y orthogonal to the row direction.

Each pixel 51 includes a photoelectric converting unit such as a photodiode and a color filter which is disposed above the photoelectric converting unit. The entire color filters which are included in all pixels 51 are arranged in a Bayer pattern.

In FIG. 2, a pixel 51 with a reference symbol "R" is a pixel that detects red light. Further, a pixel 51 with a reference symbol "G" is a pixel that detects green light. In addition, a pixel 51 with a reference symbol "B" is a pixel that detects blue light. Hereinafter, the pixel 51 with a reference symbol "R" is also referred to as an R pixel 51. Further, the pixel 51 with a reference symbol "G" is also referred to as a G pixel 51. In addition, the pixel 51 with a reference symbol "B" is also referred to as a B pixel 51.

The solid-state imaging element 5 includes two types of pixel rows, that is a GR pixel row in which G pixels 51 and R pixels 51 are alternately arranged in parallel in the row direction X and a BG pixel row in which B pixels 51 and G pixels 51 are alternately arranged in parallel in the row direction X. The two types of pixel rows are alternately arranged in parallel in the column direction Y.

All BG pixel rows which are included in the solid-state imaging element 5 include a plurality of pixel rows (hereinafter, referred to as phase difference pixel rows) which includes a phase difference pixel for detecting a phase difference.

In FIG. 2, a shade and a reference symbol 51a are attached to the G pixel 51 which serves as a phase difference pixel. The phase difference pixel 51a includes two types of pixels, that is, a pixel in which an optical opening of the photoelectric converting unit is eccentrically arranged at a right side and a pixel in which an optical opening of the photoelectric converting unit is eccentrically arranged at a left side. The phase difference pixel 51a may include two types of pixels, that is, a pixel in which an optical opening of the photoelectric converting unit is upwardly eccentrically arranged and a pixel in which an optical opening of the photoelectric converting unit is downwardly eccentrically arranged. The configuration of the phase difference pixel may use a well-known configuration.

The solid-state imaging element 5 may include phase difference pixel rows which are arranged at an interval of $(2^{n+1}-1)$ (n is a natural number) pixel rows. In an example of FIG. 2, n=1 so that the phase difference pixel rows are arranged at an interval of three pixel rows.

In each phase difference pixel row of the solid-state imaging element 5, a plurality of phase difference pixels 51a is arranged in accordance with a predetermined rule.

The digital camera illustrated in FIG. 1 may capture a still image and a moving image. At the time of capturing a still image, the system control unit 11 controls to read a signal from a pixel of each phase difference pixel row included in the solid-state imaging element 5. The system control unit 11 uses a signal read out from the phase difference pixel 51a among signals read out from each phase difference pixel row to perform auto focusing control by a phase difference detecting method.

In the meantime, at the time of capturing a moving image, the system control unit 11 performs any of first control and second control for every plural pixel rows (BG pixel rows in the example of FIG. 2) which are arranged in parallel at regular intervals in the column direction Y and are the same type as the phase difference pixel row. The system control unit 11 performs the first control or the second control for every plural pixel rows so that the plural pixel rows are formed such that the pixel rows on which the first control is performed and the pixel rows on which the second control is performed are alternately arranged in parallel in the column direction Y.

According to the first control, no signal is read out from each pixel 51 of the pixel row to be controlled and a signal is read out from each pixel 51 of two pixel rows which are adjacent to the pixel row to be controlled in the column direction Y.

According to the second control, the signal is read out from each pixel 51 of the pixel row to be controlled.

Further, the plurality of pixel rows on which the first control and the second control will be performed is set so as to include all phase difference pixel rows and at least GB pixel rows which are located in the middle between the phase difference phase rows which are adjacent in the column direction Y, among the pixel rows which are included in the solid-state imaging element 5. The system control unit. 11 performs the first control at least on the phase difference pixel rows.

Hereinafter, an operation of the system control unit 11 at the time of capturing the moving image will be described.

Figure 3:
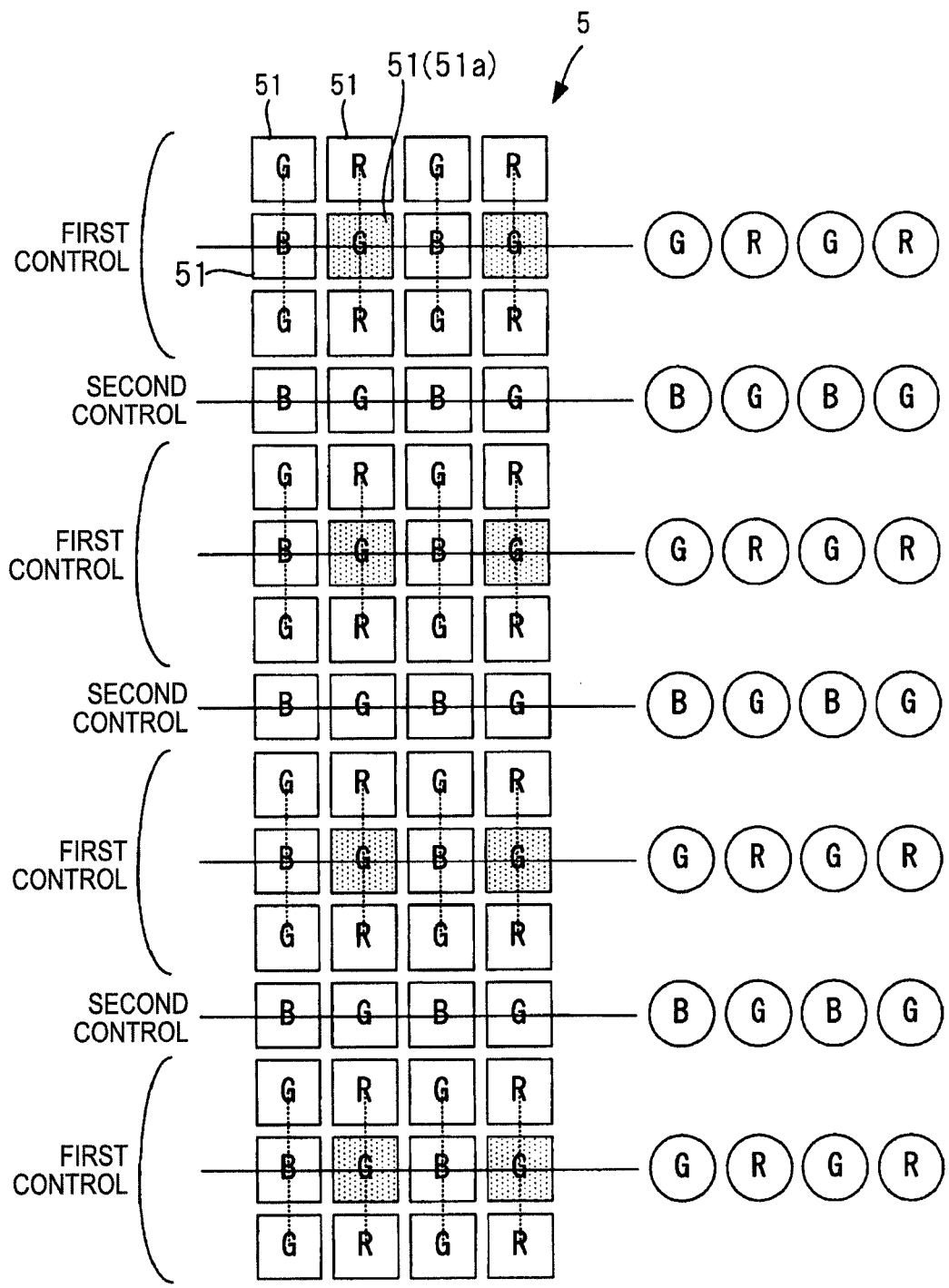
FIG. 3 is a diagram illustrating control contents at the time of capturing a moving image which is performed by a system control unit 11 in a digital camera illustrated in FIG. 1.

FIG. 3 is a diagram illustrating control contents at the time of capturing a moving image which is performed by the system control unit 11 in the digital camera illustrated in FIG. 1. In FIG. 3, as the pixels 51 included in the solid-state imaging element 5, 15 pixel rows each of which includes four pixels 51 are illustrated.

In an example of FIG. 3, among all pixel rows included in the solid-state imaging element 5, even numbered pixel rows are pixel rows on which the first control or the second control is performed. At the time of capturing a moving image, when the exposure of the solid-state imaging element 5 for one frame finishes, the system control unit 11, as illustrated in FIG. 3, performs the first control on each phase difference pixel row included in the solid-state imaging element 5 and performs the second control on the BG pixel rows which are located in the middle between the phase difference pixel rows included in the solid-state imaging element 5 which are adjacent in the column direction Y.

That is, the system control unit 11 controls the imaging element driving unit 10 so as to read a signal from each pixel 51 of the BG pixel rows which are adjacent to the phase difference pixel rows of the solid-state imaging element 5 thereon and therebelow. Further, the system control unit 11 controls the imaging element driving unit 10 so as to read a signal from each pixel 51 of the BG pixel row in the middle between the phase difference pixel rows of the solid-state imaging element 5 which are adjacent in the column direction Y.

The signals read out by the first control and the second control are processed by the analog signal processing unit 6 and the A/D converting circuit 7 and then stored in the main memory 16.

Next, the digital signal processing unit 17 adds the signals read out from two same color pixels 51 (two pixels 51 connected by a broken line in FIG. 3) which are adjacent to the pixel 51 of the phase difference pixel row in the column direction Y, among the signals read by the first control which are stored in the main memory 16.

A spatial position of the signal which is obtained by the addition matches with a position of a center of gravity of two pixels 51 which are output sources of two signals to be added.

When the signal addition processing by the digital signal processing unit 17 finishes, the spatial arrangement of the captured image signal which is stored in the main memory 16 is considered that in a subject space, a G signal is disposed in a position of the B pixel 51 included in each phase difference pixel row of the solid-state imaging element 5 and a R signal is disposed in a position of the G pixel 51 included in each phase difference pixel row of the solid-state imaging element 5.

Further, the spatial arrangement is considered that the B signal and the G signal are disposed in the positions of the B pixel 51 and the G pixel 51 included in the BG pixel rows which are located in the middle between the phase difference pixel rows of the solid-state imaging element 5 which are adjacent in the column direction Y, respectively.

In addition, in FIG. 3, a circle denoted by a reference symbol "R" indicates the R signal, a circle denoted by a reference symbol "G" indicates the G signal, and a circle denoted by a reference symbol "B" indicates the B signal.

Therefore, the spatial arrangement of the captured image signal is considered that a signal row in which the G signal and the R signal are alternately arranged in parallel in the row direction X and a signal row in which the B signal and the G signal are alternately arranged in parallel in the row direction X are alternately arranged in parallel in the column direction Y at regular intervals. The digital signal processing unit 17 processes the captured image signal to generate image data so that image data without having jaggies may be obtained.

As described above, the system control unit 11 performs the first control and the second control such that the pixel rows on which the first control is performed and the pixel rows on which the second control is performed are alternately arranged in parallel in the column direction Y. As a result, by the addition processing which is performed by the digital signal processing unit 17 at a rear stage, a captured image signal with a spatial arrangement in which the signal row including the G signal and the R signal and the signal row including the B signal and the G signal are alternately arranged in parallel in the column direction Y at regular intervals may be generated. Accordingly, image data without having jaggies may be obtained.

Further, a signal read out from the phase difference pixel row is not included in the captured image signal with the above spatial arrangement. For this reason, there is no need to correct the signal from the phase difference pixel. Therefore, the moving image may be captured without increasing a processing load.

In addition, the addition processing for a signal read out from the two same color pixels 51 which are adjacent to the pixels 51 of the phase difference pixel row in the column direction Y may be performed by the analog signal processing unit 6. For example, two line memories and adders are used so that signals read out from two same color pixels 51 adjacent to the pixels 51 of the phase difference pixel row in the column direction Y may be added in an analog manner.

Further, a CCD type may be used as the solid-state imaging element 5. When the CCD type is used as the solid-state imaging element 5, the system control unit 11 controls the imaging element driving unit 10 to be driven to mix the signals (signal charges) read out from the two same color pixels 51 which are adjacent to the pixels 51 of the phase difference pixel row in the column direction Y in a charge transmission path.

By the above driving, signals obtained by adding the signals read out from the two pixels 51 may be generated in the solid-state imaging element 5. In this case, the system control unit 11 serves as a signal adding unit which adds the signals read out from the two same color pixels 51 which are adjacent to the pixels 51 of the phase difference pixel row in the column direction Y.

Further, in the captured image signal obtained after performing the addition processing by the digital signal processing unit 17, there is double sensitivity difference between a signal which is read by the first control and obtained after performing the addition processing and a signal which is read by the second control. Therefore, the sensitivity difference is preferably corrected in order to improve image quality. For example, the digital signal processing unit 17 performs a processing to amplify the signal read by the second control with a constant gain. By doing this, the sensitivity difference between signals may be removed.

Figure 4:
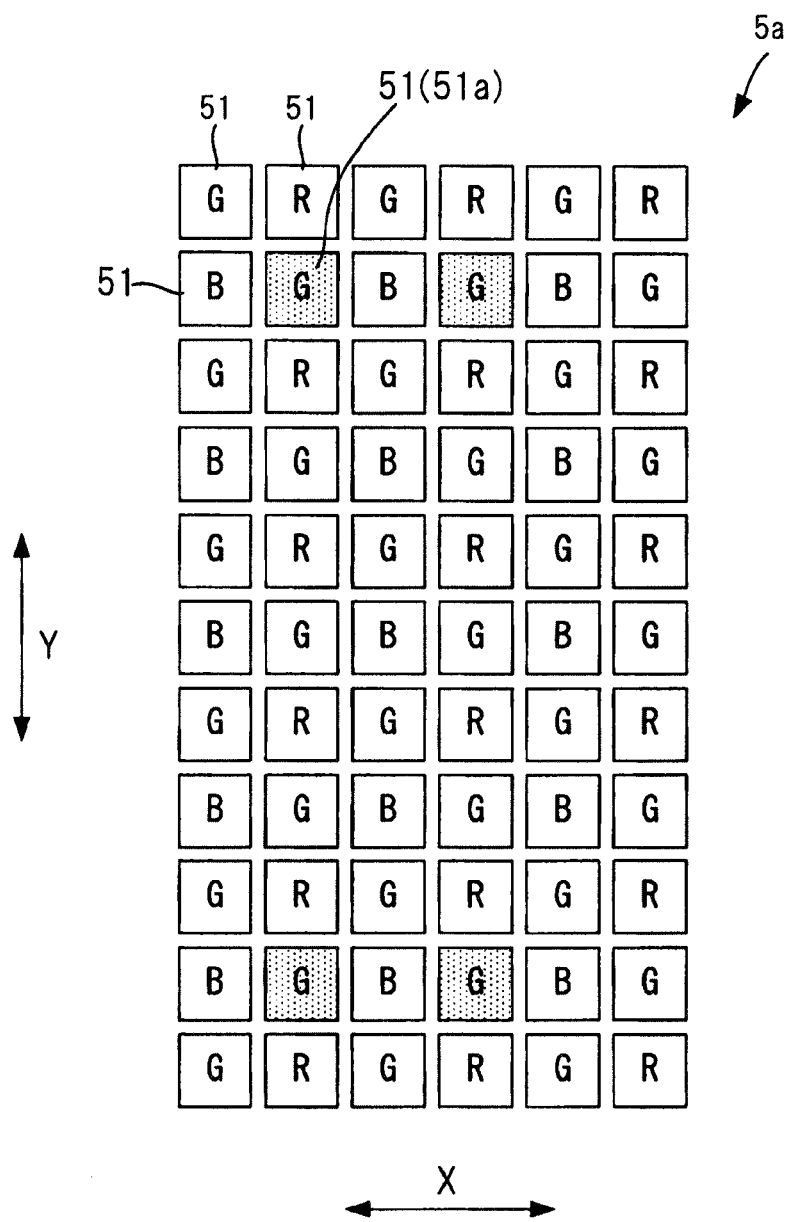
FIG. 4 is a diagram illustrating a modified example of a solid-state imaging element 5 illustrated in FIG. 2.

FIG. 4 is a diagram illustrating a modified example of the solid-state imaging element 5 illustrated in FIG. 2. A solid-state imaging element 5a illustrated in FIG. 4 has the same configuration as the solid-state imaging element 5 illustrated in FIG. 2 except that the phase difference pixel rows are arranged at an interval of seven pixel rows (a value of n is 2).

Hereinafter, an operation when a digital camera with the solid-state imaging element 5a mounted therein captures a moving image will be described.

Figure 5:
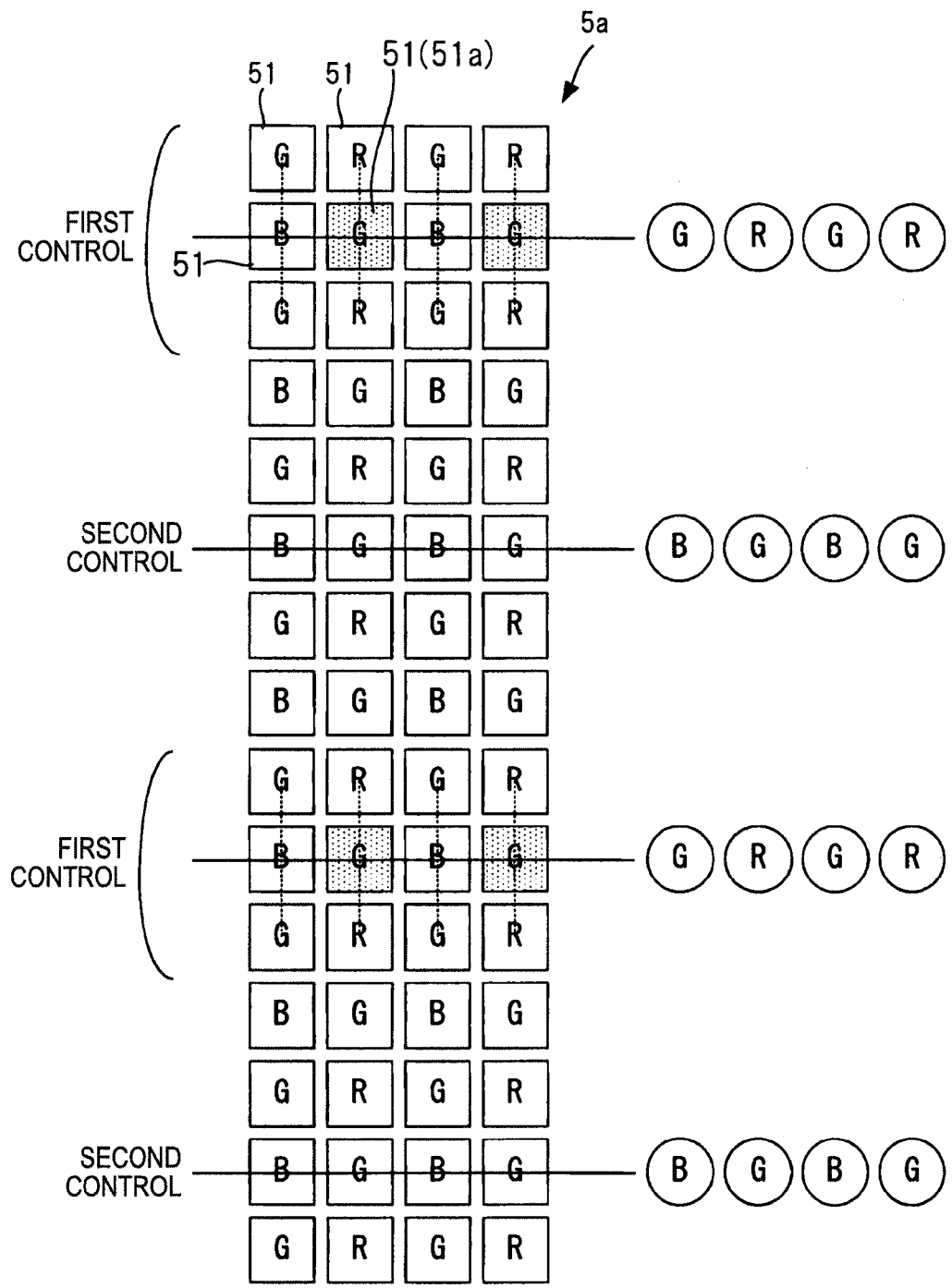
FIG. 5 is a diagram illustrating control contents at the time of capturing a moving image which is performed by a system control unit 11 in a digital camera with the solid-state imaging element illustrated in FIG. 4 mounted therein.

FIG. 5 is a diagram illustrating control contents at the time of capturing a moving image which is performed by a system control unit 11 in a digital camera with the solid-state imaging element 5a mounted therein. In FIG. 5, as the pixels 51 included in the solid-state imaging element 5a, 15 pixel rows each of which includes four pixels 51 are illustrated.

In an example of FIG. 5, the first control or the second control is performed on the phase difference pixel rows and a BG pixel row which is located in the middle between the phase difference pixel rows which are adjacent in the column direction Y, among all pixel rows included in the solid-state imaging element 5a. At the time of capturing a moving image, when the exposure of the solid-state imaging element 5a for one frame finishes, the system control unit 11, as illustrated in FIG. 5, performs the first control on each phase difference pixel row of the solid-state imaging element 5a and performs the second control on the BG pixel rows of the solid-state imaging element 5a which are located in the middle between the phase difference pixel rows which are adjacent in the column direction Y.

That is, the system control unit 11 controls the imaging element driving unit 10 so as to read a signal from two GR pixel rows which are adjacent to the phase difference pixel rows of the solid-state imaging element 5a thereon and therebelow. Further, the system control unit 11 controls the imaging element driving unit 10 so as to read a signal from a BG pixel row located in the middle between the phase difference pixel rows of the solid-state imaging element 5a which are adjacent in the column direction Y.

The signals read out by the first control and the second control are processed by the analog signal processing unit 6 and the A/D converting circuit 7 and then stored in the main memory 16.

Next, the digital signal processing unit 17 adds the signals read out from two same color pixels 51 (two pixels 51 connected by a broken line in FIG. 5) which are adjacent to the pixel 51 of the phase difference pixel row of the solid-state imaging element 5a in the column direction Y, among the signals read by the first control which are stored in the main memory 16. A spatial position of the signal which is obtained by the addition matches with a position of a center of gravity of two pixels 51 which are output sources of two signals to be added.

When the signal addition processing by the digital signal processing unit 17 finishes, the spatial arrangement of the captured image signal which is stored in the main memory 16 is considered that in a subject space, a G signal is disposed in a position of the B pixel 51 included in each phase difference pixel row of the solid-state imaging element 5a and a R signal is disposed in a position of the G pixel 51 included in each phase difference pixel row of the solid-state imaging element 5a.

Further, the spatial arrangement is considered that the B signal and the G signal are disposed in the positions of the B pixel 51 and the G pixel 51 included in the BG pixel rows which are located in the middle between the phase difference pixel rows of the solid-state imaging element 5a which are adjacent in the column direction Y, respectively.

In addition, in FIG. 5, a circle denoted by a reference symbol "R" indicates the R signal, a circle denoted by a reference symbol "G" indicates the G signal, and a circle denoted by a reference symbol "B" indicates the B signal.

Therefore, the spatial arrangement of the captured image signal is considered that the signal row including the G signal and the R signal and the signal row including the B signal and the G signal are alternately arranged in parallel in the column direction Y at regular intervals. The digital signal processing unit 17 uses the captured image signal to generate image data so that jaggies may be prevented.

The pixel row on which the first control and the second control are performed is determined as illustrated in FIG. 5 so that a captured image signal with the spatial arrangement in which the signal row including the G signal and the R signal and the signal row including the B signal and the G signal are alternately arranged in parallel in the column direction Y at regular intervals may be generated by the digital signal processing unit 17 at the rear stage. The number of lines of the signal row which configures the captured image signal is reduced by half as compared with the captured image signal of FIG. 3. Therefore, a frame rate of the moving image may be improved.

Further, the effect that the frame rate of the moving image is improved may be obtained by a solid-state imaging element with the phase difference pixel rows which are arranged at an interval of $(2^{n+1}-1)$ (n is a natural number of 2 or larger) pixel rows.

When the solid-state imaging element which includes the phase difference pixel rows at an interval of $(2^{n+1}-1)$ (n is a natural number of 2 or larger) pixel rows is used, a plurality of pixel rows on which the first control or the second control will be performed may be appropriately set in accordance with a target frame rate. However, the plurality of pixel rows needs to include at least the phase difference pixel rows and the pixel row which is located in the middle between the phase difference pixel rows which are adjacent in the column direction Y.

For example, if n=3, the system control unit 11 performs the first control on the phase difference pixel rows and performs the second control on the BG pixel row which is located in the middle between the phase difference pixel rows which are adjacent in the column direction Y.

The captured image signal which is read by the first control and the second control and then obtained after performing the addition processing by the digital signal processing unit 16 has half of a resolution of the captured image signal illustrated in FIG. 5. Therefore, the frame rate may be further improved.

Figure 6:
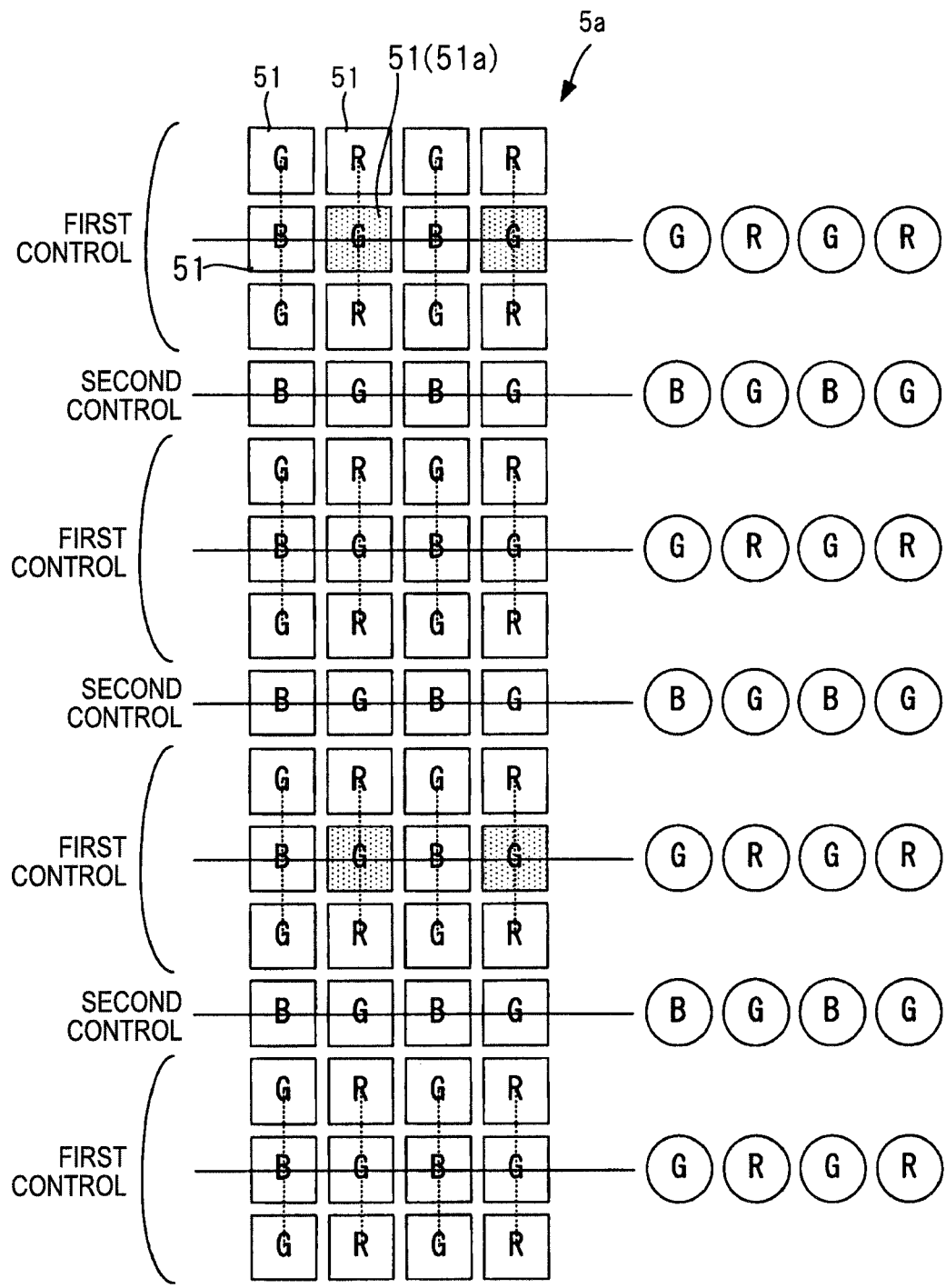
FIG. 6 is a diagram illustrating another example of control contents at the time of capturing a moving image which is performed by a system control unit 11 in a digital camera with the solid-state imaging element illustrated in FIG. 4 mounted therein.

Further, if n=2, a pixel row on which the first control is performed and a pixel row on which the second control is performed may be determined as illustrated in FIG. 6.

In an example of FIG. 6, the first control or the second control is performed on the phase difference pixel row and three BG pixel rows which are located between the phase difference pixel rows which are adjacent in the column direction Y, among all pixel rows included in the solid-state imaging element 5a. At the time of capturing a moving image, when the exposure of the solid-state imaging element 5a for one frame finishes, the system control unit 11, as illustrated in FIG. 6, performs the first control on each phase difference pixel row and the BG pixel rows which are located in the middle between the phase difference pixel rows which are adjacent in the column direction Y, among all pixel rows included in the solid-state imaging element 5a, and performs the second control on the other BG pixel rows.

That is, the system control unit 11 controls the imaging element driving unit 10 so as to read a signal from the GR pixel rows which are adjacent to the phase difference pixel row thereon and therebelow, among all pixel rows included in the solid-state imaging element 5a.

Further, the system control unit 11 controls the imaging element driving unit 10 so as to read a signal from BG pixel rows which are adjacent to the BG pixel row thereon and therebelow, which is located in the middle between the phase difference pixel rows which are adjacent in the column direction Y, among all pixel rows included in the solid-state imaging element 5a.

Further, the system control unit 11 controls the imaging element driving unit 10 so as to read a signal from a BG pixel row which is located in the middle between the BG pixel row which is located in the middle between the phase difference pixel rows which are adjacent in the column direction Y and the phase difference pixel row which is adjacent to the BG pixel row in the column direction Y, among all pixel rows included in the solid-state imaging element 5.

The signals read out by the first control and the second control are processed by the analog signal processing unit 6 and the A/D converting circuit 7 and then stored in the main memory 16.

Next, the digital signal processing unit 17 adds the signals read out from two same color pixels 51 (two pixels 51 connected by a broken line in FIG. 6) which are adjacent to the pixel 51 of the phase difference pixel row of the solid-state imaging element 5a in the column direction Y, among the signals read by the first control which is stored in the main memory 16. A spatial position of the signal which is obtained by the addition matches with a position of a center of gravity of two pixels 51 which are output sources of two signals to be added.

Further, the digital signal processing unit 17 adds the signals read out from two same color pixels 51 (two pixels 51 connected by a broken line in FIG. 6) which are adjacent to the pixel 51 of the BG pixel rows, which are located in the middle between the phase difference pixel rows of the solid-state imaging element 5a which are adjacent in the column direction Y, in the column direction Y, among the signals read by the first control which are stored in the main memory 16. A spatial position of the signal which is obtained by the addition matches with a position of a center of gravity of two pixels 51 which are output sources of two signals to be added.

When the signal addition processing by the digital signal processing unit 17 finishes, the spatial arrangement of the captured image signal which is stored in the main memory 16 is considered that a G signal is disposed in a position of the B pixel 51 included in each phase difference pixel row of the solid-state imaging element 5a and a R signal is disposed in a position of the G pixel 51 included in each phase difference pixel row of the solid-state imaging element 5a.

Further, the spatial arrangement is considered that the G signal is disposed in the positions of the B pixel 51 included in the BG pixel rows which are located in the middle between the phase difference pixel rows of the solid-state imaging element 5a which are adjacent in the column direction Y and the R signal is disposed in the position of the G pixel 51 included in the BG pixel rows.

Further, the spatial arrangement is considered that the B signal and the G signal are disposed in the positions of the B pixel 51 and the G pixel 51 included in the phase difference pixel row and a BG pixel row excepting the BG pixel rows which are located in the middle between the phase difference pixel rows which are adjacent in the column direction Y, among the pixel rows included in the solid-state imaging element 5.

In addition, in FIG. 6, a circle denoted by a reference symbol "R" indicates the R signal, a circle denoted by a reference symbol "G" indicates the G signal, and a circle denoted by a reference symbol "B" indicates the B signal.

As described above, if n=2, the system control unit 11 performs the first control not only on the phase difference pixel row but also on the pixel row which is located in the middle between the phase difference pixel rows which are adjacent in the column direction Y in the plurality of pixel rows to be controlled and performs the second control on the other pixel rows. Therefore, as compared with the example of FIG. 5, the number of lines of the signal rows which configure the captured image signal may be doubled. Therefore, it is possible to capture the moving image with an improved resolution.

Further, when n≥3, the first control is performed not only on the phase difference pixel rows but also on the pixel rows which are located in the middle between the phase difference pixel rows which are adjacent in the column direction Y and the pixel row on which the first control or the second control will be performed is determined such that the pixel row on which the first control is performed and the pixel row on which the second control is performed are alternately arranged in parallel in the column direction Y. By doing this, similarly to the case when n=2, the resolution of the moving image may be improved.

Further, even in the control contents illustrated in FIGS. 5 and 6, the addition of the signals read by the first control may be performed by the analog signal processing unit 6 or in the solid-state imaging element 5a.

Figure 7:
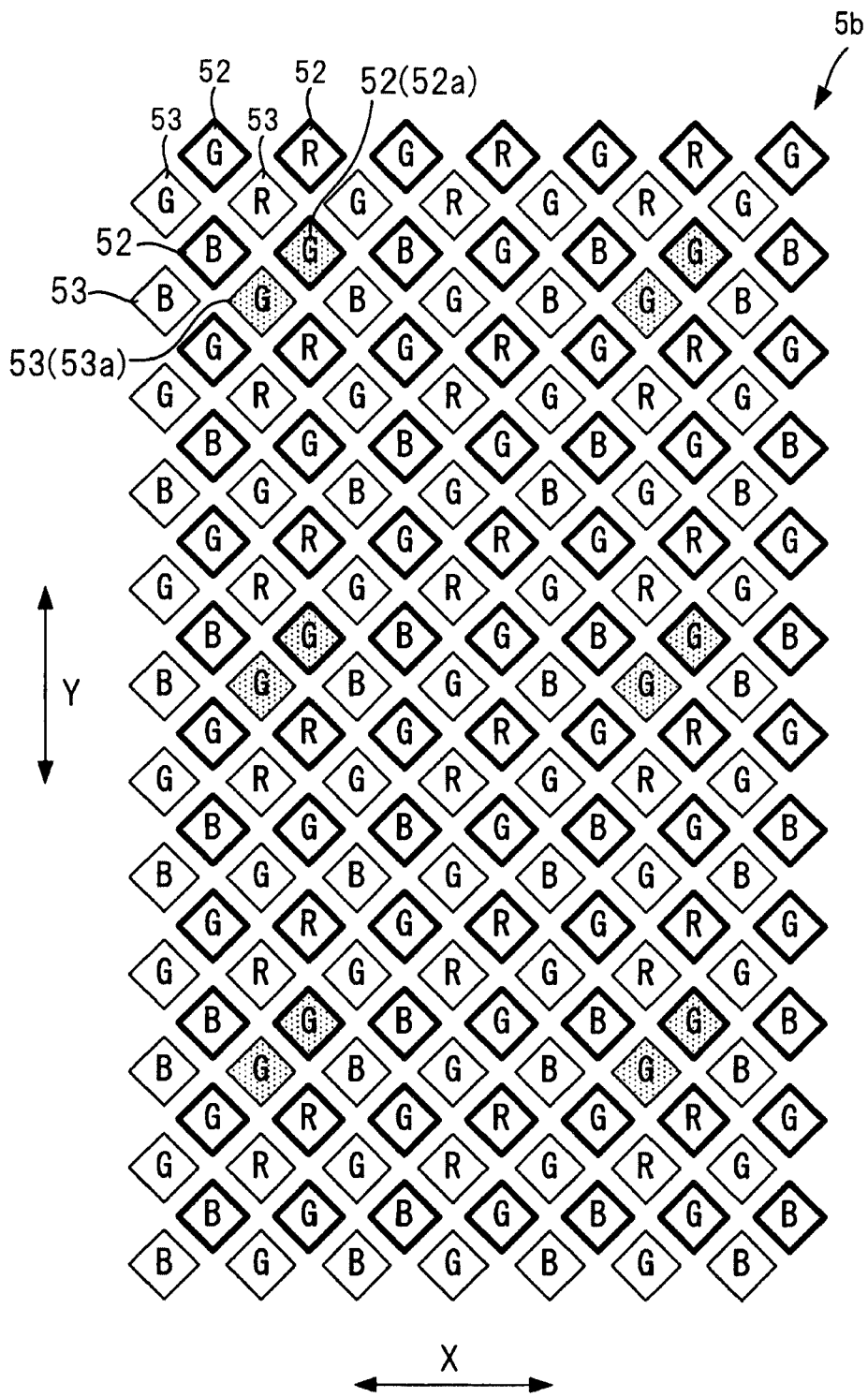
FIG. 7 is a diagram illustrating a modified example of a solid-state imaging element 5 illustrated in FIG. 2.

FIG. 7 is a diagram illustrating a modified example of the solid-state imaging element 5 illustrated in FIG. 2. A solid-state imaging element 5b illustrated in FIG. 7 includes a first pixel group including a plurality of pixels 52 which is two dimensionally arranged (in a square lattice shape in the example of FIG. 7) in a row direction X and a column direction Y orthogonal to the row direction and a second pixel group including a plurality of pixels 53 with the same arrangement as the first pixel group.

Each pixel 52 includes a photoelectric converting unit such as a photodiode and a color filter which is disposed above the photoelectric converting unit. The color filters which are included in all pixels 52 are arranged in a Bayer pattern.

Each pixel 53 includes a photoelectric converting unit such as a photodiode and a color filter which is disposed above the photoelectric converting unit. The color filters which are included in all pixels 53 are arranged in a Bayer pattern.

In FIG. 7, a pixel with a reference symbol "R" is a pixel that detects red light. Further, a pixel with a reference symbol "G" is a pixel that detects green light. In addition, a pixel with a reference symbol "B" is a pixel that detects blue light. Hereinafter, the pixels 52 and 53 with a reference symbol "R" are also referred to as R pixels 52 and 53. Further, the pixels 52 and 53 with a reference symbol "G" are also referred to as G pixels 52 and 53. In addition, the pixels 52 and 53 with a reference symbol "B" are also referred to as B pixels 52 and 53.

The first pixel group of the solid-state imaging element 5b includes two types of pixel rows, that is a GR pixel row in which G pixels 52 and R pixels 52 are alternately arranged in parallel in the row direction X and a BG pixel row in which B pixels 52 and G pixels 52 are alternately arranged in parallel in the row direction X. The two types of pixel rows are alternately arranged in parallel in the column direction Y.

All BG pixel rows included in the first pixel group of the solid-state imaging element 5b include a plurality of phase difference pixel rows including phase difference pixels for detecting a phase difference. In FIG. 7, a shade and a reference symbol 52a are attached to the G pixel 52 which serves as a phase difference pixel.

The first pixel group of the solid-state imaging element 5b may include phase difference pixel rows which are arranged at an interval of $(2^{n+1}-1)$ (n is a natural number) pixel rows. In an example of FIG. 7, n=1 so that the phase difference pixel rows are arranged at an interval of three pixel rows in the first pixel group.

In each phase difference pixel row included in the first pixel group of the solid-state imaging element 5b, a plurality of phase difference pixels 52a is arranged in accordance with a predetermined rule.

Pixels 53 of the second pixel group which detect light with the same color as each of the pixels 52 are arranged next to each of the pixels 52 of the first pixel group in the same direction with respect to the each pixel 52 (in the example of FIG. 7, a diagonal lower left direction). Each pixel 52 and the pixel 53 which is adjacent to the pixel 52 in the same direction form a pixel pair. Further, each of the pixel rows included in the first pixel group of the solid-state imaging element 5b and each of pixel rows in the second pixel group which includes the pixels 53 which form the pair with the pixels 52 included in each of the pixel rows form a pixel row pair.

The pixel in the second pixel group of the solid-state imaging element 5b which forms the pair with a phase difference pixel 52a of the first pixel group is a pixel which detects a phase difference. In FIG. 7, the pixel 53 which detects the phase difference is attached with a shade and a reference symbol 53a.

The phase difference pixel 52a is a pixel in which an optical opening of a photoelectric converting unit is eccentrically arranged at a right side. The phase difference pixel 53a is a pixel in which an optical opening of a photoelectric converting unit is eccentrically arranged at a left side. Phase difference information may be obtained by the phase difference pixel 52a and the phase difference pixel 53a. The phase difference pixel 52a may be a pixel in which an optical opening of a photoelectric converting unit is upwardly eccentrically arranged and the phase difference pixel 53a may be a pixel in which an optical opening of a photoelectric converting unit is downwardly eccentrically arranged. The configuration of the phase difference pixel may use a well-known configuration.

In a digital camera with the solid-state imaging element 5b mounted therein, at the time of capturing a moving image, the system control unit 11 performs any of first control and second control for every plural pixel rows (BG pixel rows in the example of FIG. 7) which are arranged in parallel at regular intervals in the column direction Y in the first pixel group and are the same type as the phase difference pixel row. The system control unit 11 performs the first control or the second control for every plural pixel rows of the first pixel group so that the plural pixel rows are formed such that the pixel rows on which the first control is performed and the pixel rows on which the second control is performed are alternately arranged in parallel in the column direction Y.

Further, the system control unit 11 performs the first control on the pixel row of the second pixel group which forms a pair with the pixel row in the first pixel group on which the first control is performed. In addition, the system control unit 11 performs the second control on the pixel row of the second pixel group which forms a pair with the pixel row in the first pixel group on which the second control is performed.

According to the first control, no signal is read out from each pixel 52 and 53 of the pixel row to be controlled and a signal is read out from each pixel 52 and 53 of two pixel rows which are adjacent to the pixel row to be controlled in the column direction Y.

According to the second control, the signal is read out from each pixel 52 and 53 of the pixel row to be controlled.

Further, the plurality of pixel rows of the first pixel group on which the first control and the second control will be performed is set to include all phase difference pixel rows included in the first pixel group of the solid-state imaging element 5b and GB pixel rows which are located in the middle between the phase difference pixel rows of the first pixel group which are adjacent in the column direction Y. The system control unit 11 performs the first control at least on each phase difference pixel row of the first pixel group.

Hereinafter, an operation of the system control unit 11 at the time of capturing a moving image in a digital camera with the solid-state imaging element 5b mounted therein will be described.

Figure 8:
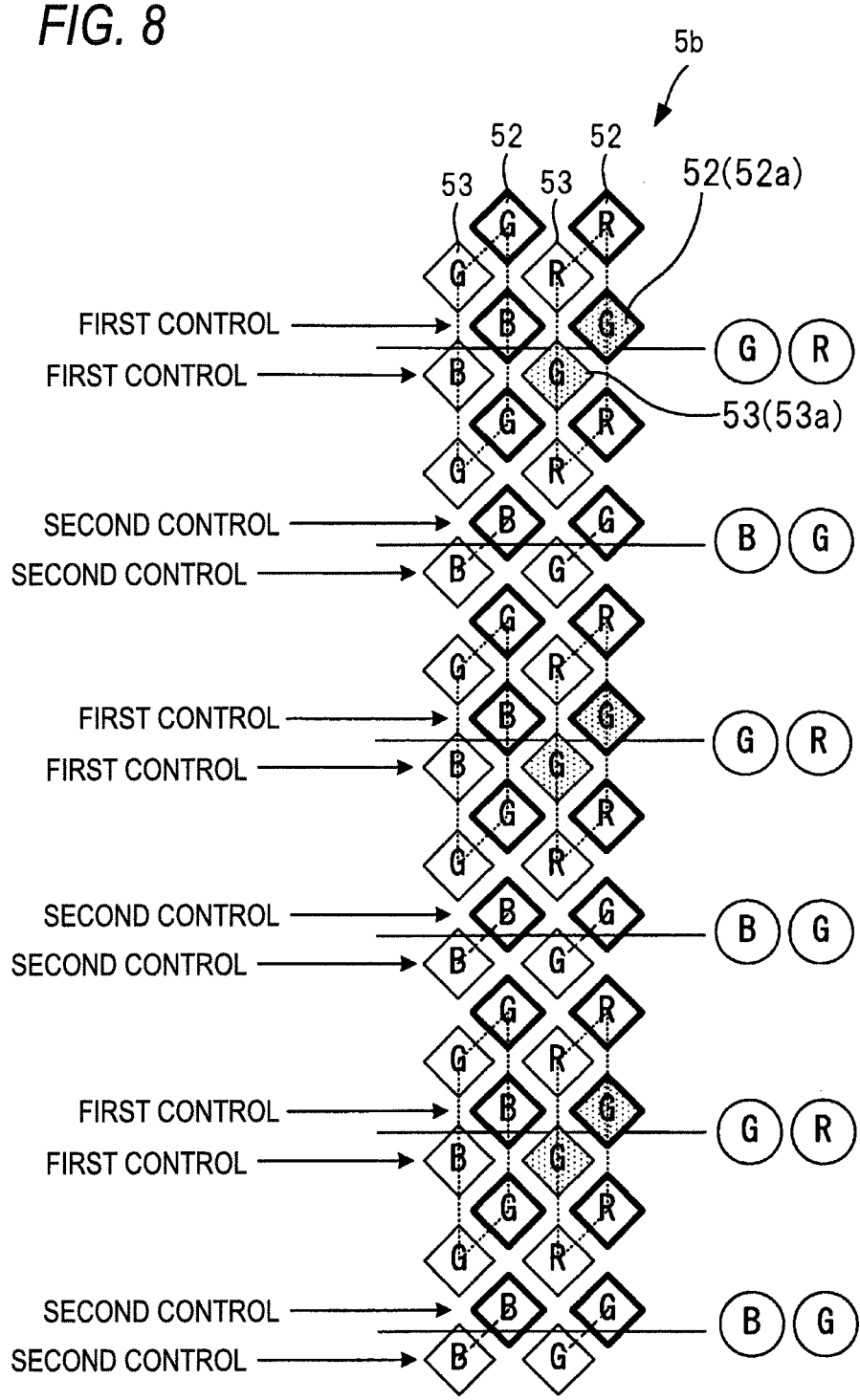
FIG. 8 is a diagram illustrating control contents at the time of capturing a moving image which is performed by a system control unit 11 in a digital camera with the solid-state imaging element illustrated in FIG. 7 mounted therein.

FIG. 8 is a diagram illustrating control contents at the time of capturing a moving image which is performed by a system control unit 11 in a digital camera with the solid-state imaging element 5b mounted therein. In FIG. 8, as pixel rows included in the solid-state imaging element 5b, twelve pixel rows of the first pixel group each including two pixels 52 and twelve pixel rows of the second pixel group each including two pixels 53 are illustrated.

In an example of FIG. 8, among all pixel rows of the first pixel group included in the solid-state imaging element 5b, even numbered pixel rows are pixel rows on which the first control or the second control is performed. At the time of capturing the moving image, when the exposure of the solid-state imaging element 5b for one frame finishes, the system control unit 11, as illustrated in FIG. 8, performs the first control on the phase difference pixel rows of the first pixel group and the phase difference pixel row of the second pixel group which forms a pair with the phase difference pixel row of the first pixel group. Further, the system control unit 11 performs the second control on the BG pixel row which is located in the middle between the phase difference pixel rows of the first pixel group which are adjacent in the column direction Y and a BG pixel row of the second pixel group which forms a pair with the BG pixel row of the first pixel group.

That is, the system control unit 11 controls an imaging element driving unit 10 so as to read out signals from the pixels 52 of the GR pixel rows which are adjacent to the phase difference pixel row of the first pixel group thereon and therebelow and the pixels 53 of the second pixel group which form the pairs with the pixels 52. Further, the system control unit 11 controls an imaging element driving unit 10 so as to read out signals from the pixels 52 of the BG pixel rows which are located in the middle between the phase difference pixel rows of the first pixel group which are adjacent in the column direction Y and the pixels 53 of the second pixel group which form the pairs with the pixels 52.

The signals read out by the first control and the second control are processed by the analog signal processing unit 6 and the A/D converting circuit 7 and then stored in the main memory 16.

Next, the digital signal processing unit 17 adds the signals read out from four pixels (four pixels connected by a broken line in FIG. 8) from two same color pixels 52 which are adjacent to the pixel 52 of the phase difference pixel row of the first pixel group in the column direction Y and the pixels 53 of the second pixel group which form the pairs with the two same color pixels 52, among the signals read by the first control which are stored in the main memory 16. A spatial position of the signal which is obtained by the addition matches with a position of a center of gravity of two pixels 52 and two pixels 53 which are output sources of four signals to be added.

Further, the digital signal processing unit 17 adds the signals read out from two pixels (two pixels connected by a one dot chain line in FIG. 8) from the pixel 52 of the BG pixel row which is located in the middle between the phase difference pixel rows of the first pixel group which are adjacent in the column direction Y and the pixel 53 of the second pixel group which forms the pair with the pixel 52, among the signals read by the second control which are stored in the main memory 16. A spatial position of the signal which is obtained by the addition matches with a position of a center of gravity of pixels 52 and 53 which are output sources of two signals to be added.

When the signal addition processing by the digital signal processing unit 17 finishes, the spatial arrangement of the captured image signal which is stored in the main memory 16 is considered that a G signal is disposed in a position of a center of gravity of the B pixel 52 included in the phase difference pixel row of the first pixel group and the B pixel 53 which forms the pair with the B pixel 52 and a R signal is disposed in a position of a center of gravity of the G pixel 52 included in the phase difference pixel row of the first pixel group and the G pixel 53 which forms the pair with the G pixel 52, in the subject space.

Further, the spatial arrangement is considered that a B signal is disposed in a position of a center of gravity of the B pixel 52 included in the BG pixel row which is located in the middle between the phase difference pixel rows of the first pixel group which are adjacent in the column direction Y and the B pixel 53 which forms the pair with the B pixel 52.

Further, the spatial arrangement is considered that a B signal is disposed in a position of a center of gravity of the B pixel 52 included in the BG pixel row which is located in the middle between the phase difference pixel rows of the first pixel group which are adjacent in the column direction Y and the B pixel 53 which forms the pair with the B pixel 52.

In addition, in FIG. 8, a circle denoted by a reference symbol "R" indicates the R signal, a circle denoted by a reference symbol "G" indicates the G signal, and a circle denoted by a reference symbol "B" indicates the B signal.

Therefore, the spatial arrangement of the captured image signal is considered that a signal row in which the G signal and the R signal are alternately arranged in parallel in the row direction X and a signal row in which the B signal and the G signal are alternately arranged in parallel in the row direction X are alternately arranged in parallel in the column direction Y at regular intervals. The digital signal processing unit 17 processes the captured image signal to generate image data so that image data without having jaggies may be obtained.

In the captured image signal, there is a double sensitivity difference between a signal which is read by the first control and obtained after performing the addition processing and a signal which is read by the second control and obtained after performing the addition processing. Therefore, the sensitivity difference is preferably corrected in order to improve an image quality. For example, the digital signal processing unit 17 performs a processing to amplify the signal read by the second control and obtained after performing the addition processing with a constant gain. By doing this, the sensitivity difference between signals may be removed.

Figure 9:
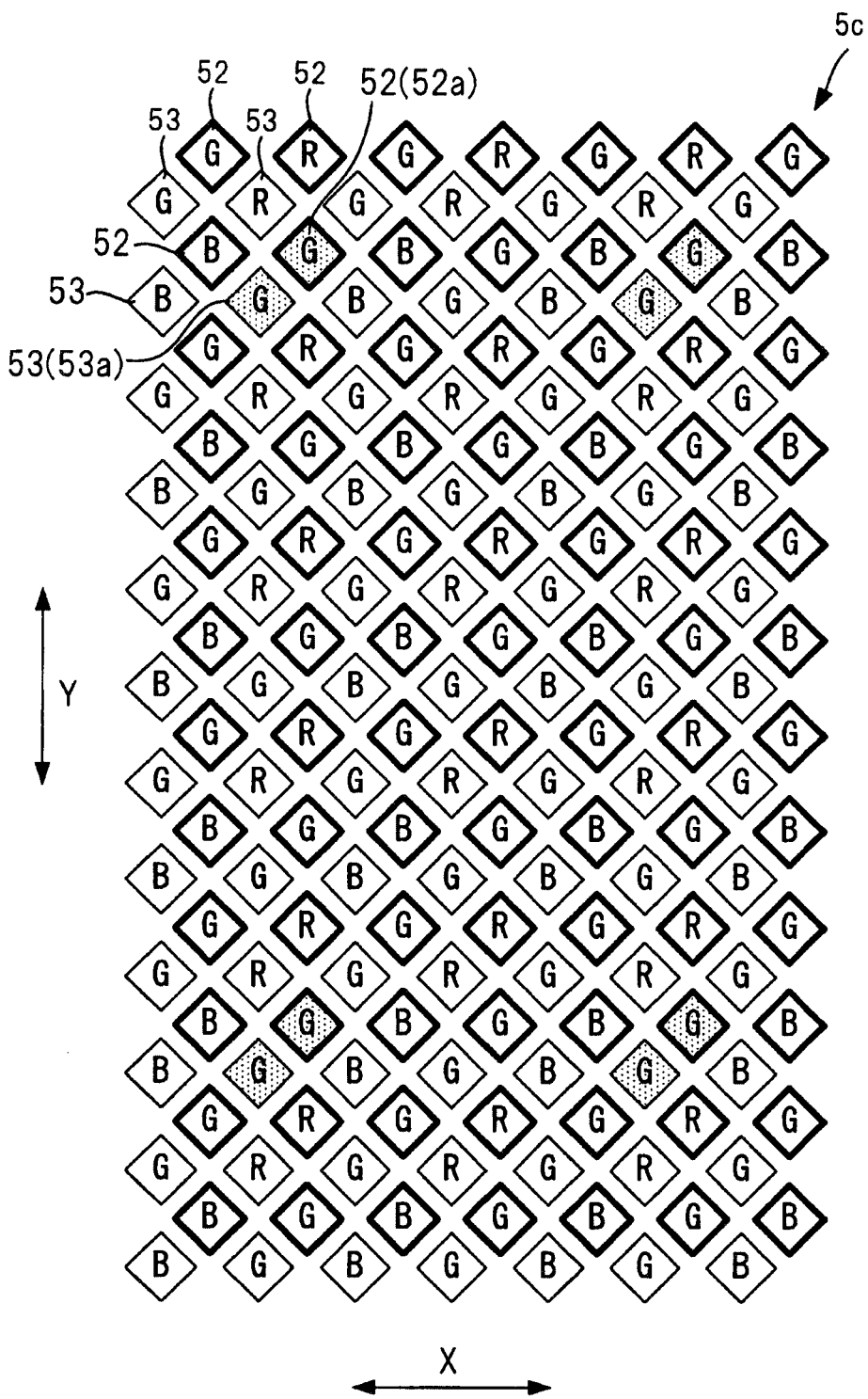
FIG. 9 is a diagram illustrating a modified example of a solid-state imaging element 5b illustrated in FIG. 7.

FIG. 9 is a diagram illustrating a modified example of the solid-state imaging element 5b illustrated in FIG. 7. A solid-state imaging element 5c illustrated in FIG. 9 has the same configuration as the solid-state imaging element 5b illustrated in FIG. 7 except that the phase difference pixel rows are arranged at an interval of seven pixel rows (a value of n is 2).

Hereinafter, an operation when a digital camera with the solid-state imaging element 5c mounted therein captures a moving image will be described.

Figure 10:
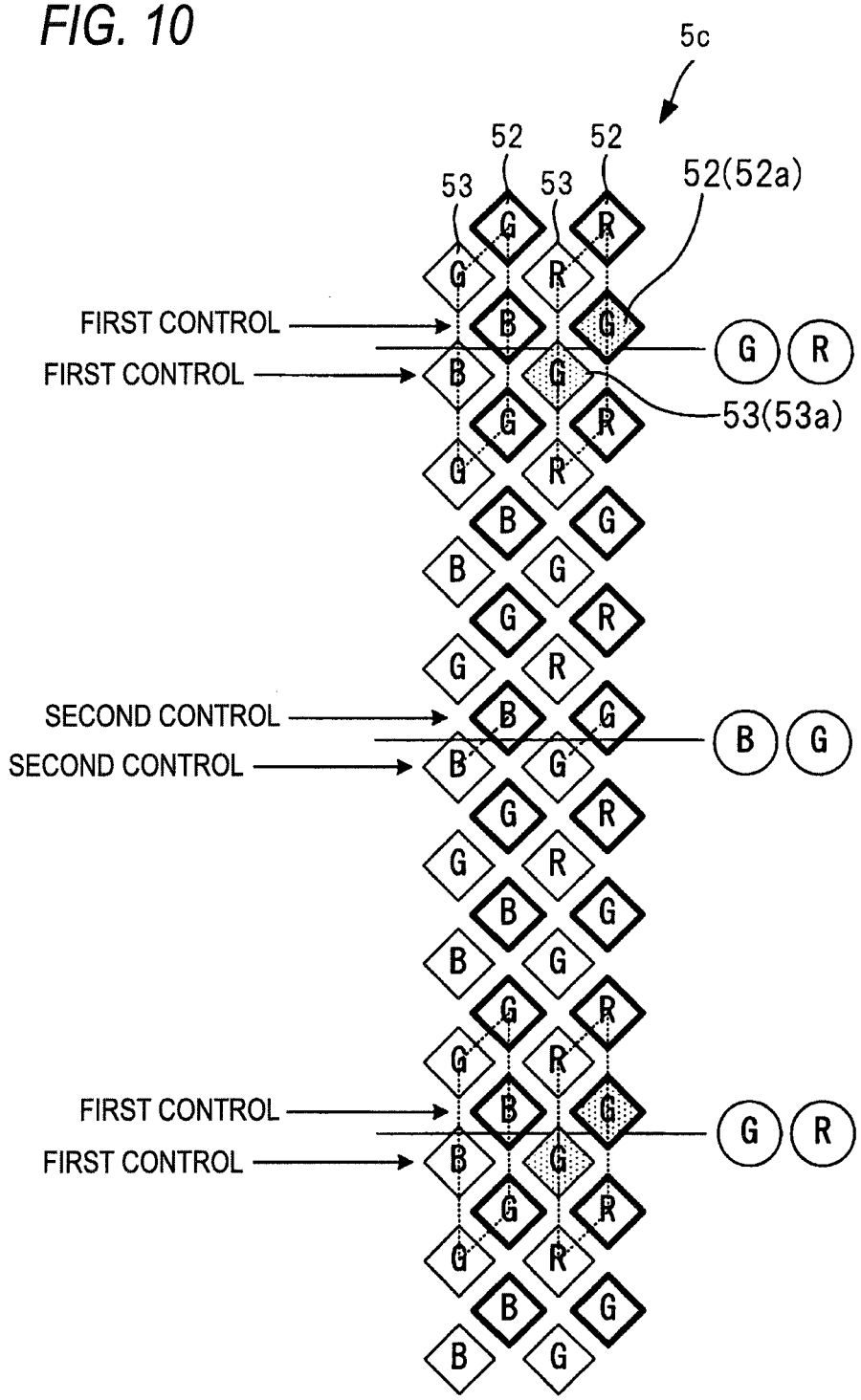
FIG. 10 is a diagram illustrating control contents at the time of capturing a moving image which is performed by a system control unit 11 in a digital camera with the solid-state imaging element illustrated in FIG. 9 mounted therein.

FIG. 10 is a diagram illustrating control contents at the time of capturing a moving image which is performed by a system control unit 11 in a digital camera with the solid-state imaging element 5c mounted therein. In FIG. 10, as pixel rows included in the solid-state imaging element 5c, twelve pixel rows of the first pixel group each including two pixels 52 and twelve pixel rows of the second pixel group each including two pixels 53 are illustrated.

In an example of FIG. 10, the first control or the second control is performed on the phase difference pixel row and a BG pixel row which is located in the middle between the phase difference pixel rows which are adjacent in the column direction Y, among all pixel rows of the first pixel group included in the solid-state imaging element 5c. At the time of capturing the moving image, when the exposure of the solid-state imaging element 5c for one frame finishes, the system control unit 11, as illustrated in FIG. 10, performs the first control on the phase difference pixel rows of the first pixel group and the phase difference pixel row of the second pixel group which forms a pair with the phase difference pixel row of the first pixel group. Further, the system control unit 11 performs the second control on the BG pixel row which is located in the middle between the phase difference pixel rows of the first pixel group which are adjacent in the column direction Y and a BG pixel row of the second pixel group which forms a pair with the BG pixel row of the first pixel group.

That is, the system control unit 11 controls an imaging element driving unit 10 so as to read out signals from the pixels 52 of the GR pixel rows which are adjacent to the phase difference pixel row of the first pixel group thereon and therebelow and the pixels 53 of the second pixel group which form the pairs with the pixels 52.

Further, the system control unit 11 controls an imaging element driving unit 10 so as to read out signals from the pixels 52 of the BG pixel row which is located in the middle between the phase difference pixel rows of the first pixel group which are adjacent in the column direction Y and the pixels 53 of the second pixel group which form the pairs with the pixels 52.

The signals read out by the first control and the second control are processed by the analog signal processing unit 6 and the A/D converting circuit 7 and then stored in the main memory 16.

Next, the digital signal processing unit 17 adds the signals read out from four pixels (four pixels connected by a broken line in FIG. 10) from two same color pixels 52 which are adjacent to the pixel 52 of the phase difference pixel row of the first pixel group in the column direction Y and the pixels 53 of the second pixel group which form the pairs with the two same color pixels 52, among the signals read by the first control which are stored in the main memory 16. A spatial position of the signal which is obtained by the addition matches with a position of a center of gravity of two pixels 52 and two pixels 53 which are output sources of four signals to be added.

Further, the digital signal processing unit 17 adds the signals read out from two pixels (two pixels connected by a one dot chain line in FIG. 10) from the pixel 52 of the BG pixel row which is located in the middle between the phase difference pixel rows of the first pixel group which are adjacent in the column direction Y and the pixel 53 of the second pixel group which forms the pair with the pixel 52, among the signals read by the second control which are stored in the main memory 16. A spatial position of the signal which is obtained by the addition matches with a position of a center of gravity of pixels 52 and 53 which are output sources of two signals to be added.

When the signal addition processing by the digital signal processing unit 17 finishes, the spatial arrangement of the captured image signal which is stored in the main memory 16 is considered that a G signal is disposed in a position of a center of gravity of the B pixel 52 included in the phase difference pixel row of the first pixel group and the B pixel 53 which forms the pair with the B pixel 52 and a R signal is disposed in a position of a center of gravity of the G pixel 52 included in the phase difference pixel row of the first pixel group and the G pixel 53 which forms the pair with the G pixel 52, in the subject space.

Further, the spatial arrangement is considered that a B signal is disposed in a position of a center of gravity of the B pixel 52 included in the BG pixel row which is located in the middle between the phase difference pixel rows of the first pixel group which are adjacent in the column direction Y and the B pixel 53 which forms the pair with the B pixel 52.

Further, the spatial arrangement is considered that a G signal is disposed in a position of a center of gravity of the G pixel 52 included in the BG pixel row which is located in the middle between the phase difference pixel rows of the first pixel group which are adjacent in the column direction Y and the G pixel 53 which forms the pair with the G pixel 52.

In addition, in FIG. 10, a circle denoted by a reference symbol "R" indicates the R signal, a circle denoted by a reference symbol "G" indicates the G signal, and a circle denoted by a reference symbol "B" indicates the B signal.

Therefore, the spatial arrangement of the captured image signal is considered that a signal row in which the G signal and the R signal are alternately arranged in parallel in the row direction X and a signal row in which the B signal and the G signal are alternately arranged in parallel in the row direction X are alternately arranged in parallel in the column direction Y at regular intervals. The digital signal processing unit 17 processes the captured image signal to generate image data so that image data without having jaggies may be obtained.

The pixel row on which the first control and the second control are performed is determined as illustrated in FIG. 10 so that a captured image signal with the spatial arrangement in which the signal row including the G signal and the R signal and the signal row including the B signal and the G signal are alternately arranged in parallel in the column direction Y at regular intervals may be generated by the digital signal processing unit 17 at the rear stage. The number of lines of the signal row which configures the captured image signal is reduced by half as compared with the captured image signal of FIG. 8. Therefore, a frame rate of the moving image may be improved.

Further, the effect that the frame rate of the moving image is improved may be obtained by a solid-state imaging element with the phase difference pixel rows which are arranged at an interval of $(2^n-1)$ (n is a natural number of 2 or larger) pixel rows, similarly to the solid-state imaging elements 5 and 5a.

Figure 11:
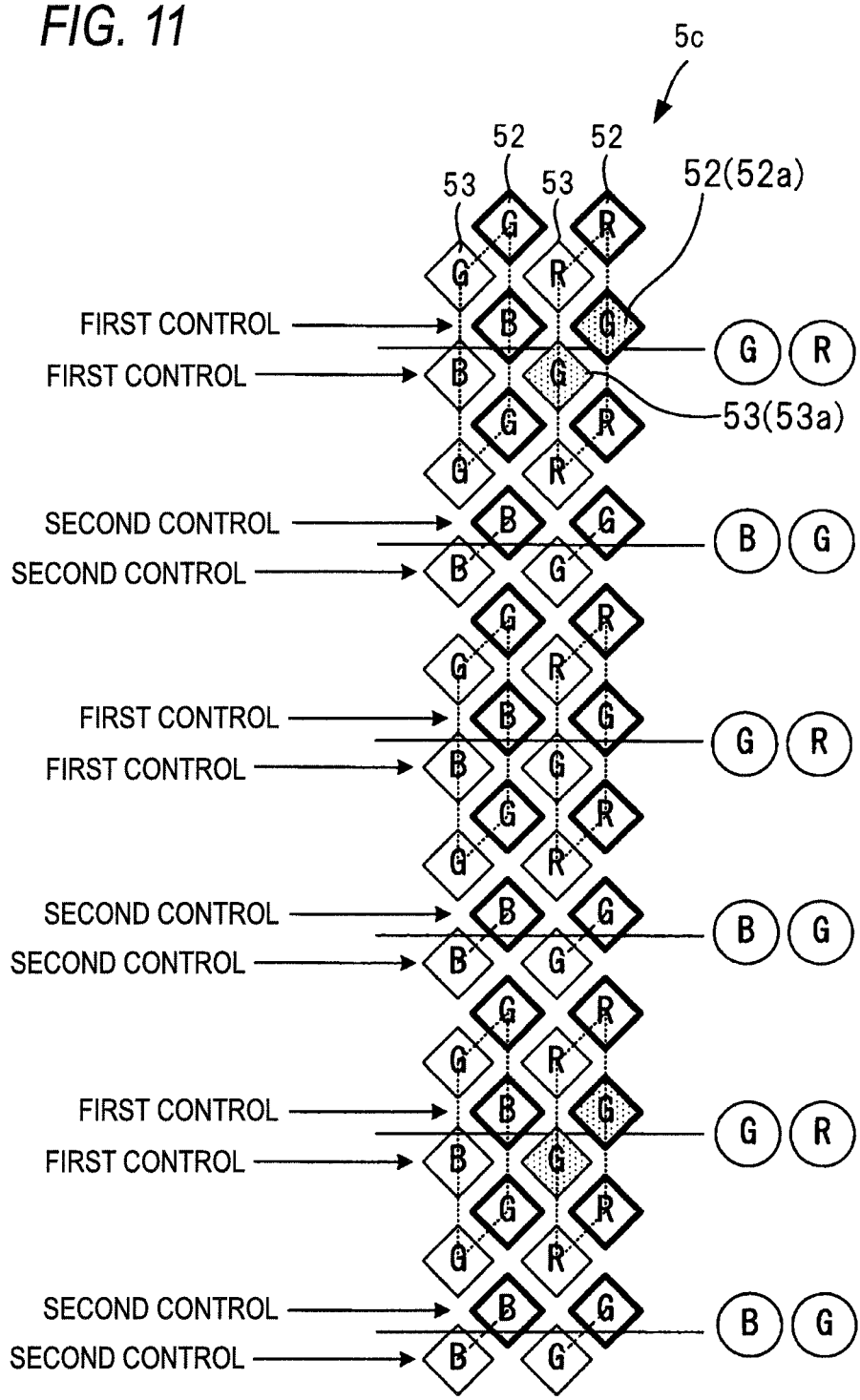
FIG. 11 is a diagram illustrating another example of control contents at the time of capturing a moving image which is performed by a system control unit 11 in a digital camera with the solid-state imaging element illustrated in FIG. 9 mounted therein.

Further, if n=2, a pixel row on which the first control is performed and a pixel row on which the second control is performed may be determined as illustrated in FIG. 11.

In an example of FIG. 11, the first control or the second control is performed on the phase difference pixel row and three BG pixel rows which are located between the phase difference pixel rows which are adjacent in the column direction Y, among all pixel rows included in the solid-state imaging element 5c. At the time of capturing a moving image, when the exposure of the solid-state imaging element 5c for one frame finishes, the system control unit 11, as illustrated in FIG. 11, performs the first control on each phase difference pixel row and the BG pixel rows which are located in the middle between the phase difference pixel rows which are adjacent in the column direction Y, among all BG pixel rows included in the solid-state imaging element 5c, and performs the second control on the other BG pixel rows.

The signals read out by the first control and the second control are processed by the analog signal processing unit 6 and the A/D converting circuit 7 and then stored in the main memory 16.

Next, the digital signal processing unit 17 adds the signals read out from four pixels (four pixels connected by a broken line in FIG. 11) from two same color pixels 52 which are adjacent to the pixel 52 of the phase difference pixel row of the first pixel group in the column direction Y and the pixels 53 of the second pixel group which form the pairs with the two same color pixels 52, among the signals read by the first control which are stored in the main memory 16. A spatial position of the signal which is obtained by the addition matches with a position of a center of gravity of two pixels 52 and two pixels 53 which are output sources of four signals to be added.

Further, the digital signal processing unit 17 adds the signals read out from four pixels (four pixels connected by a broken line in FIG. 11) from two same color pixels 52 which are adjacent to the pixel 52 of the BG pixel row in the column direction Y which is located in the middle of the phase difference pixel row of the first pixel group which are adjacent in the column direction Y and the pixels 53 which form the pairs with the two same color pixels 52, among the signals read by the first control which are stored in the main memory 16. A spatial position of the signal which is obtained by the addition matches with a position of a center of gravity of two pixels 52 and two pixels 53 which are output sources of four signals to be added.

Further, the digital signal processing unit 17 adds the signals read out from two pixels (two pixels connected by a one dot chain line in FIG. 11) from each of pixels 52 of the BG pixel row between the BG pixel row which is located in the middle between the phase difference pixel rows of the first pixel group which are adjacent in the column direction Y and the phase difference pixel row which is adjacent in the column direction Y of the BG pixel row and the pixel 53 of the second pixel group which forms the pair with each of the pixels 52, among the signals read by the second control which are stored in the main memory 16. A spatial position of the signal which is obtained by the addition matches with a position of a center of gravity of the pixels 52 and 53 which are output sources of two signals to be added.

When the signal addition processing by the digital signal processing unit 17 finishes, the spatial arrangement of the captured image signal which is stored in the main memory 16 is considered that a G signal is disposed in a position of a center of gravity of the B pixel 52 included in the phase difference pixel row of the first pixel group and the B pixel 53 which forms the pair with the B pixel 52 and a R signal is disposed in a position of a center of gravity of the G pixel 52 included in the phase difference pixel row of the first pixel group and the G pixel 53 which forms the pair with the G pixel 52, in the subject space.

Further, the spatial arrangement is considered that a G signal is disposed in a position of a center of gravity of the B pixel 52 included in the BG pixel row which is located in the middle between the phase difference pixel rows of the first pixel group which are adjacent in the column direction Y and the B pixel 53 which forms the pair with the B pixel 52 and a R signal is disposed in a position of a center of gravity of the G pixel 52 included in the BG pixel row and the G pixel 53 which forms the pair with the G pixel 52.

Further, the spatial arrangement is considered that a B signal is disposed in a position of a center of gravity of the B pixel 52 included in the BG pixel row between the BG pixel row which is located in the middle between the phase difference pixel rows of the first pixel group which are adjacent in the column direction Y and the phase difference pixel row which is adjacent in the column direction Y of the BG pixel row and the B pixel 53 which forms the pair with the B pixel 52 and a G signal is disposed in a position of a center of gravity of the G pixel 52 included in the BG pixel row and the G pixel 53 which forms the pair with the G pixel 52.

In addition, in FIG. 11, a circle denoted by a reference symbol "R" indicates the R signal, a circle denoted by a reference symbol "G" indicates the G signal, and a circle denoted by a reference symbol "B" indicates the B signal.

As described above, if n=2, the system control unit 11 performs the first control not only on the phase difference pixel row but also on the pixel row which is located in the middle between the phase difference pixel rows which are adjacent in the column direction Y in the plurality of pixel rows of the first pixel group to be controlled and performs the second control on the other pixel rows. Therefore, as compared with the example of FIG. 10, the number of lines of the signal rows which configure the captured image signal may be doubled. Therefore, it is possible to capture the moving image with an improved resolution.

Further, when n≥3, the first control is performed not only on the phase difference pixel rows but also on the pixel rows which are located in the middle between the phase difference pixel rows which are adjacent in the column direction Y and the pixel row on which the first control or the second control will be performed is determined such that the pixel row on which the first control is performed and the pixel row on which the second control is performed are alternately arranged in parallel in the column direction Y. By doing this, similarly to the case when n=2, the resolution of the moving image may be improved.

Figure 12:
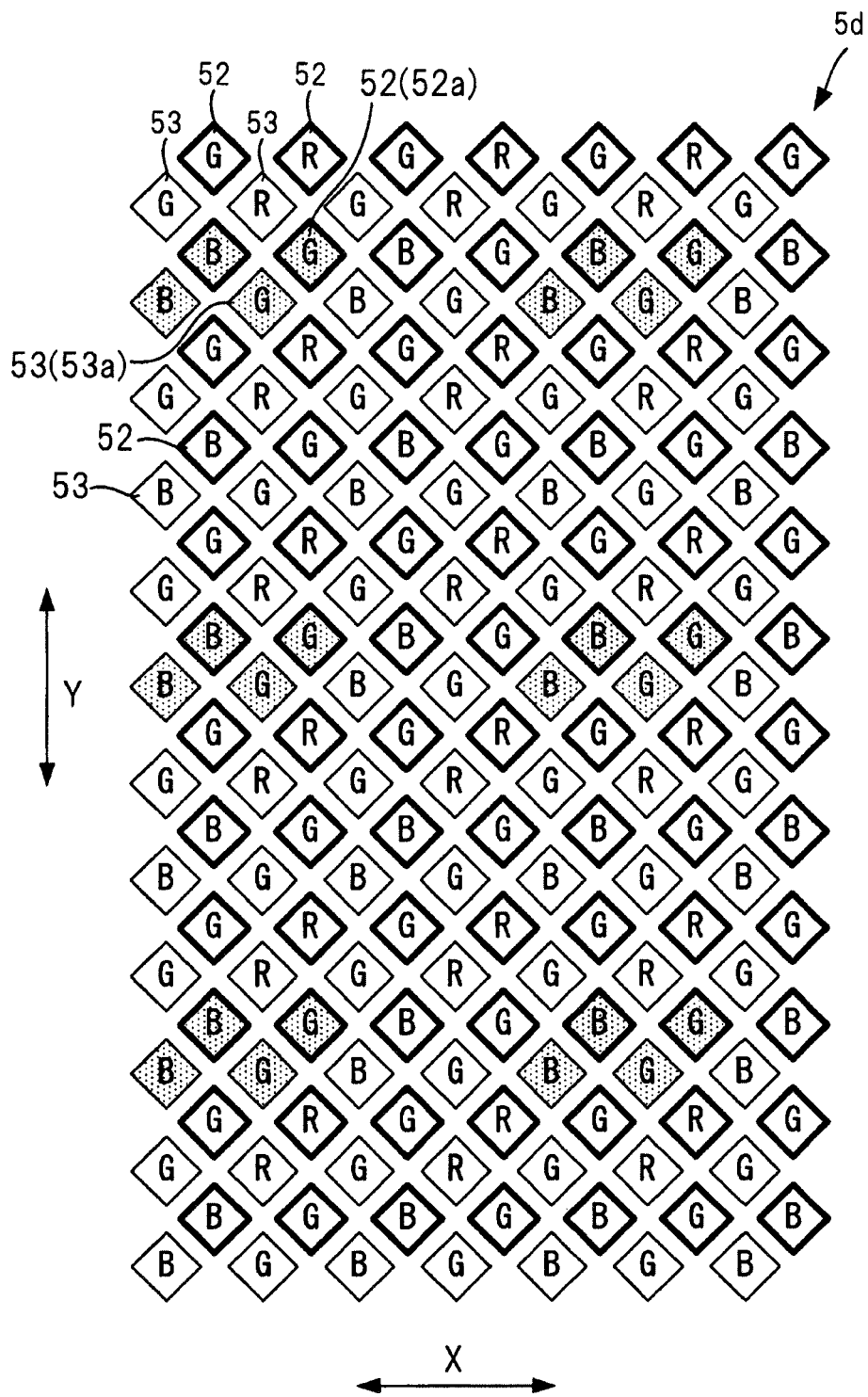
FIG. 12 is a diagram illustrating a modified example of a solid-state imaging element 5b illustrated in FIG. 7.
Figure 13:
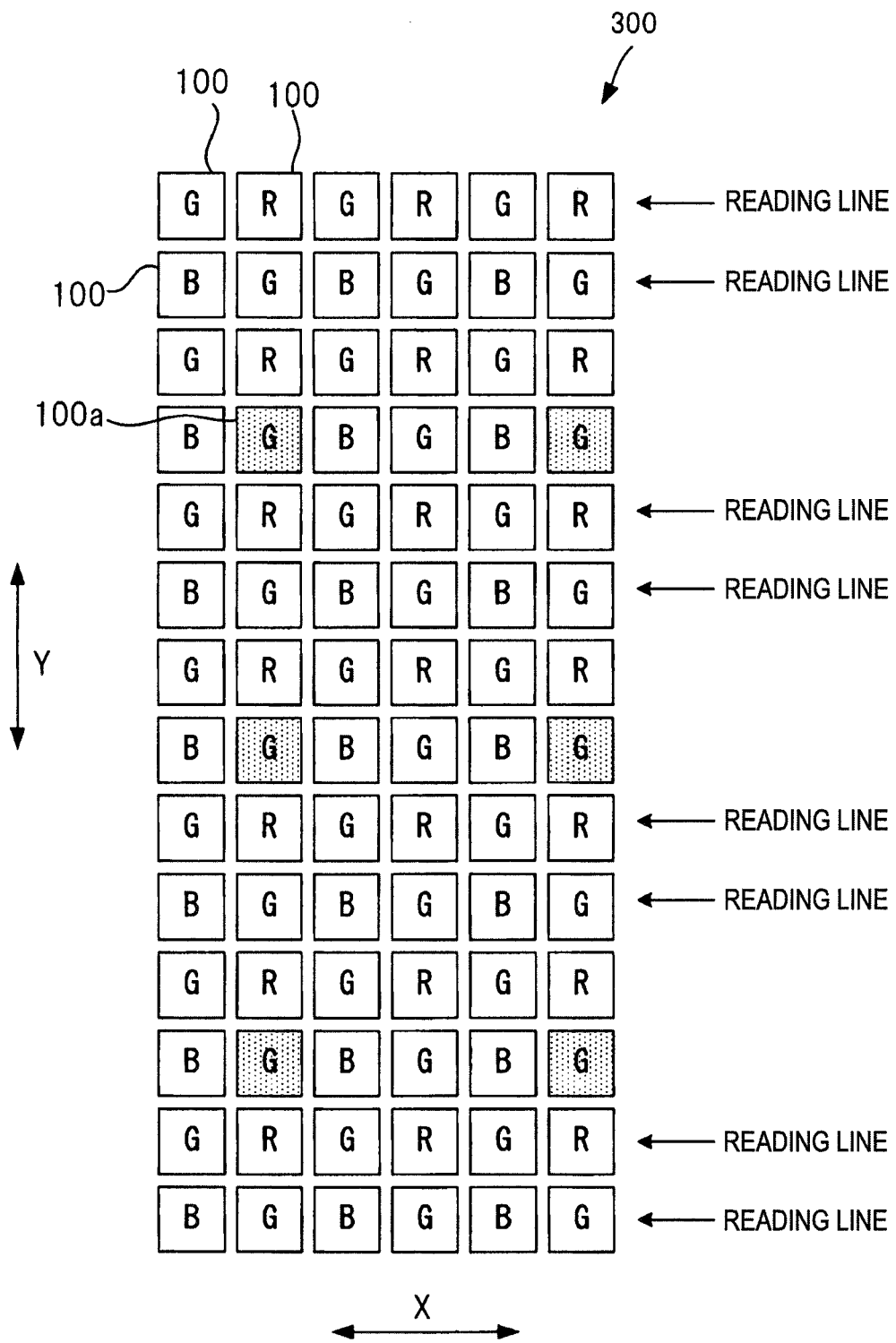
FIG. 13 is a diagram illustrating an example of a solid-state imaging element which includes a phase difference pixel.
Figure 14:
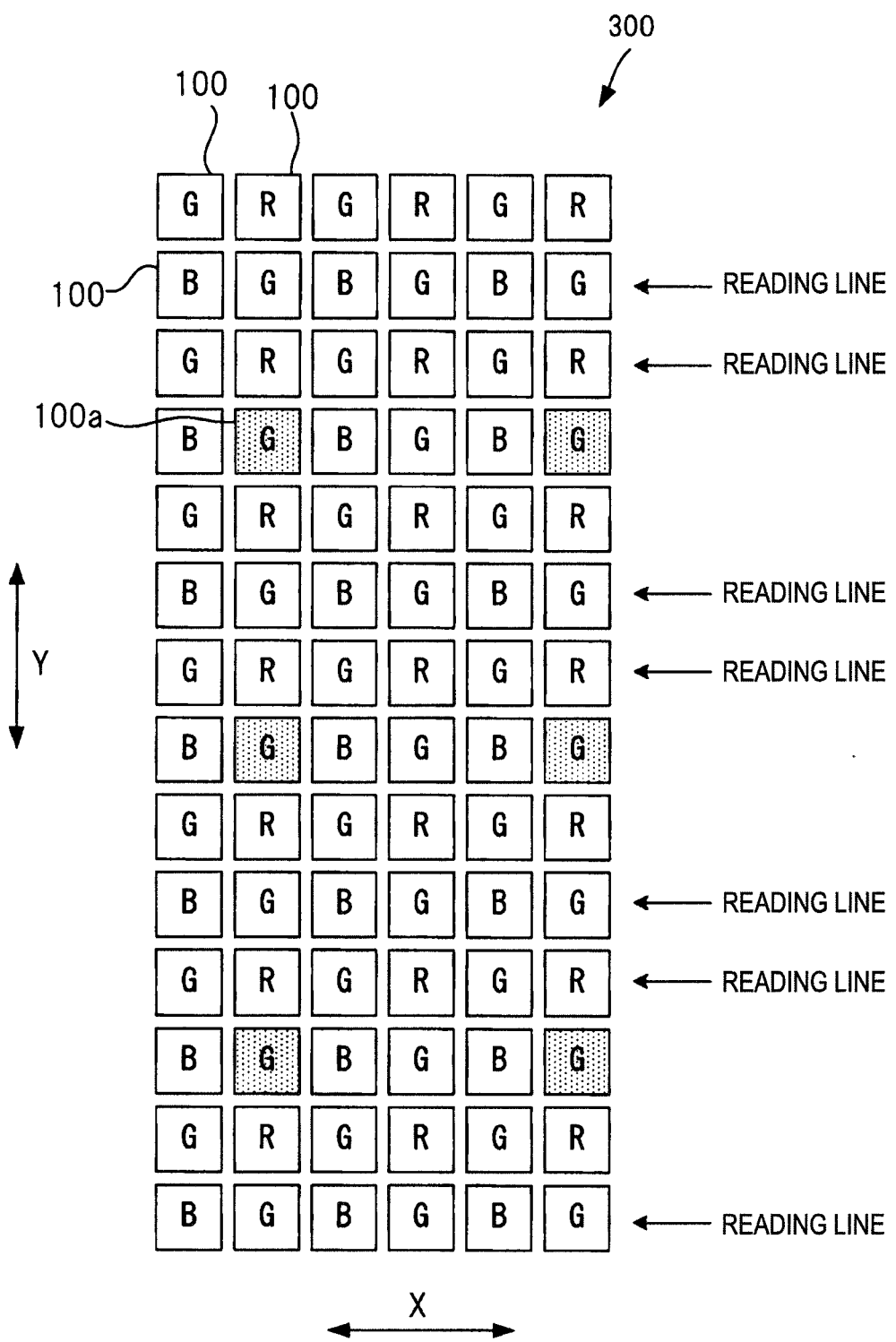
FIG. 14 is a diagram illustrating a thinning driving method of the solid-state imaging element illustrated in FIG. 13.

FIG. 12 is a diagram illustrating a modified example of the solid-state imaging element 5b illustrated in FIG. 7.

A solid-state imaging element 5d illustrated in FIG. 12 has the same configuration as the solid-state imaging element 5b except that not only G pixel but also B pixel serves as a phase difference pixel in the phase difference pixel rows included in the first pixel group and the second pixel group.

As described above, some of the B pixels also serve as the phase difference pixels so that an AF precision even in a subject with lots of information of blue may be improved.

Further, in the solid-state imaging element 5d, instead of the B pixel, some of the R pixels serve as the phase difference pixels so that the AF precision may be also improved.

In the solid-state imaging elements 5b, 5c, and 5d, the pixels 52 are arranged to be diagonally adjacent to the pixels 53 which form the pairs with the pixels 52. However, the deviated direction (the above-described same direction) of the pixel 52 and the pixel 53 which form the pair is not limited to the diagonal direction, but may be the row direction X or the column direction Y.

When the solid-state imaging elements 5b, 5c, and 5d are CCD types, for example, the solid-state imaging elements have a 16 phase driving configuration so that the control illustrated in FIGS. 8, 10, and 11 may be allowed.

Further, in the solid-state imaging elements 5 and 5a or the pixel groups of the solid-state imaging elements 5b, 5c, and 5d, some of the GR pixel rows rather than some of the BG pixel rows may serve as the phase difference pixel rows.

When the some of GR pixel rows serve as the phase difference pixel rows, the GR pixel rows need to be a target pixel row on which the first control and the second control will be performed. However, if the GR pixel row is the target pixel row on which the first control and the second control will be performed, false color may be easily noticeable. Therefore, as described till now, the target pixel row on which the first control and the second control will be performed is desirably the BG pixel.

As described above, the present description discloses the following matter.

A disclosed imaging device, includes: a solid-state imaging element including a plurality of pixels which is two-dimensionally arranged, in which the solid-state imaging element includes a pixel group in which a red pixel that detects red light, a green pixel that detects green light, and a blue pixel that detects blue light are arranged in a Bayer pattern, in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction, the GR pixel rows or the BG pixel rows which are included in the pixel group arranged in the Bayer pattern include a plurality of phase difference pixel rows which includes phase difference pixels for detecting a phase difference, the phase difference pixel rows are arranged at an interval of $(2^{n+1}-1)$ (n is a natural number) in the pixel group arranged in the Beyer pattern, a control unit is provided to perform first control or second control on the same type of plural pixel rows as the phase difference pixel rows which are arranged in parallel in the column direction at regular intervals, pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled, in the second control, a signal is read out from each pixel of the pixel row to be controlled, the same type of plural pixel rows which are arranged in parallel in the column direction at the regular intervals include all phase difference pixel rows included in the solid-state imaging element and at least a pixel row which is in a middle between the phase difference pixel rows which are adjacent in the column direction, and the control unit performs the first control at least on the phase difference pixel rows.

The disclosed imaging device, further includes: a signal adding unit which generates a signal obtained by adding signals read out from two same color pixels which are adjacent to the pixels of the pixel rows on which the first control is performed, in the column direction.

The disclosed imaging device, further includes: a sensitivity difference correcting unit which corrects a sensitivity difference between the signals read by the second control and the signals which are read by the first control to be generated by the signal adding unit.

In the disclosed imaging device, if n≥2, the control unit performs the first control on some of the pixel rows between the phase difference pixel rows which are adjacent in the column direction.

In the disclosed imaging device, the solid-state imaging element includes two pixel groups, a pixel that detects light with the same color as a pixel which is included in the other one of the two pixel groups is arranged to be adjacent to each pixel included in any one of two pixel groups in the same direction with respect to each pixel, the control unit performs the first control or the second control on each of the plurality of pixel rows in each of the two pixel groups, and a signal adding unit is further provided to add signals read out from four pixels from two same color pixels which are adjacent to the pixel of the pixel row on which the first control is performed in any one of the two pixel groups in the column direction and pixels which are included in the other one of the two pixel groups and are adjacent to the two same color pixels in the same direction and add signals read out from two pixels from a pixel of the pixel row on which the second control is performed in one of the two pixel groups and a pixel which is included in the other one of the two pixel groups and is adjacent to the pixel in the same direction.

The disclosed imaging device, further includes: a sensitivity difference correcting unit which corrects a sensitivity difference between a signal generated by adding the signal read out from the four pixels by the signal adding unit by the first control and a signal obtained by adding signals read out from the two pixels by the signal adding unit by the second control.

In the disclosed imaging device, if n≥2, the control unit performs the first control on some of the pixel rows between the phase difference pixel rows which are adjacent in the column direction, in each of two pixel groups.

In the disclosed imaging device, a BG pixel row included in the pixel group includes the phase difference pixel row.

A disclosed imaging method which uses a solid-state imaging element including a plurality of pixels which is two-dimensionally arranged, in which the solid-state imaging element includes a pixel group in which a red pixel that detects red light, a green pixel that detects green light, and a blue pixel that detects blue light are arranged in a Bayer pattern, in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction, the GR pixel rows or the BG pixel rows which are included in the pixel group arranged in the Beyer pattern includes a plurality of phase difference pixel rows which includes phase difference pixels for detecting a phase difference, the phase difference pixel rows are arranged at an interval of $(2^{n+1}-1)$ (n is a natural number) pixel rows in the pixel group arranged in the Beyer pattern, a control step which performs first control or second control on the same type of plural pixel rows as the phase difference pixel rows which are arranged in parallel in the column direction at regular intervals is provided, pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled, in the second control, a signal is read out from each pixel of the pixel row to be controlled, the same type of plural pixel rows which are arranged in the column direction at the regular intervals include all phase difference pixel rows included in the solid-state imaging element and at least a pixel row which is in a middle between the phase difference pixel rows which are adjacent in the column direction, and in the control step, the first control is performed at least on the phase difference pixel rows.

The disclosed imaging method, further includes: a signal adding step of generating a signal obtained by adding signals read out from two same color pixels which are adjacent in the column direction, in two pixel rows which are adjacent to the pixel rows on which the first control is performed.

The disclosed imaging method, further includes: a sensitivity difference correcting step of correcting a sensitivity difference between the signals read by the second control and the signals which are read by the first control to be generated by the signal adding unit.

In the disclosed imaging method, if n≥2, in the control step, the first control is performed even on some of the pixel rows between the phase difference pixel rows which are adjacent in the column direction.

In the disclosed imaging method, the solid-state imaging element includes two pixel groups, a pixel that detects light with the same color as a pixel which is included in the other one of the two pixel groups is arranged to be adjacent to each pixel included in any one of two pixel groups in the same direction with respect to each pixel, in the control step, the first control or the second control is performed on each of the plurality of pixel rows in each of the two pixel groups, and a signal adding step of adding signals read out from four pixels from two same color pixels which are adjacent to the pixel of the pixel row on which the first control is performed in any one of the two pixel groups in the column direction and pixels which are included in the other one of the two pixel groups and are adjacent to the two same color pixels in the same direction and adding signals read out from two pixels of a pixel of the pixel row on which the second control is performed in one of the two pixel groups and a pixel which is included in the other one of the two pixel groups and is adjacent to the pixel in the same direction is further provided.

The disclosed imaging method, further includes: a sensitivity difference correcting step of correcting a sensitivity difference between a signal obtained by adding the signal read out from the four pixels by the first control in the signal adding step and a signal obtained by adding signals read out from the two pixels by the second control in the signal adding step.

In the disclosed imaging method, if n≥2, in the control step, the first control is performed on some of the pixel rows between the phase difference pixel rows which are adjacent in the column direction, in each of two pixel groups.

In the disclosed imaging method, a BG pixel row included in the pixel group includes the phase difference pixel row.

Industrial Applicability

According to an imaging device and an imaging method according to the present invention, when a signal of a phase difference pixel is thinned to generate an image, the jaggies may be prevented.

Although the present invention has been described with reference to detailed and specific embodiments thereof, it is obvious to those skilled in the art that various changes or modifications may be made without departing from the spirit and scope of the present invention.

This application is based on Japanese Patent Application No. 2011-102274 filed on Apr. 28, 2011, the contents of which are herein incorporated by reference.

The invention claimed is:

1. An imaging device, comprising:
a solid-state imaging element including a plurality of pixels which is two-dimensionally arranged,
wherein the solid-state imaging element includes a pixel group in which a red pixel that detects red light, a green pixel that detects green light, and a blue pixel that detects blue light are arranged in a Bayer pattern,
in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction,
the GR pixel rows or the BG pixel rows which are included in the pixel group arranged in the Bayer pattern include a plurality of phase difference pixel rows which includes phase difference pixels for detecting a phase difference,
the phase difference pixel rows are arranged at an interval of $(2^{n+1}-1)$ (n is a natural number) in the pixel group arranged in the Beyer pattern,
a control unit is provided to perform first control or second control on the same type of plural pixel rows as the phase difference pixel rows which are arranged in parallel in the column direction at regular intervals,
pixel rows on which the first control is performed and pixel rows on which the second control is performed are alternately arranged in parallel in the column direction,
in the first control, a signal is not read out from each pixel of the pixel rows to be controlled but a signal is read out from each pixel of two pixel rows which are adjacent to the pixel row to be controlled,
in the second control, a signal is read out from each pixel of the pixel row to be controlled,
the same type of plural pixel rows which are arranged in parallel in the column direction at the regular intervals include all phase difference pixel rows included in the solid-state imaging element and at least a pixel row which is in a middle between the phase difference pixel rows which are adjacent in the column direction, and
the control unit performs the first control at least on the phase difference pixel rows.

2. The imaging device of claim 1, further comprising:
a signal adding unit which generates a signal obtained by adding signals read out from two same color pixels which are adjacent to the pixels of the pixel rows on which the first control is performed, in the column direction.

3. The imaging device of claim 2, further comprising:
a sensitivity difference correcting unit which corrects a sensitivity difference between the signals read by the second control and the signals which are read by the first control to be generated by the signal adding unit.

4. The imaging device of claim 1, wherein, if n≥2, the control unit performs the first control on some of the pixel rows between the phase difference pixel rows which are adjacent in the column direction.

5. The imaging device of claim 1, wherein the solid-state imaging element includes two pixel groups,
a pixel that detects light with the same color as a pixel which is included in the other one of the two pixel groups is arranged to be adjacent to each pixel included in any one of two pixel groups in the same direction with respect to each pixel,
the control unit performs the first control or the second control on each of the plurality of pixel rows in each of the two pixel groups, and
a signal adding unit is further provided to add signals read out from four pixels from two same color pixels which are adjacent to the pixel of the pixel row on which the first control is performed in any one of the two pixel groups in the column direction and pixels which are included in the other one of the two pixel groups and are adjacent to the two same color pixels in the same direction and add signals read out from two pixels from a pixel of the pixel row on which the second control is performed in one of the two pixel groups and a pixel which is included in the other one of the two pixel groups and is adjacent to the pixel in the same direction.

6. The imaging device of claim 5, further comprising:
a sensitivity difference correcting unit which corrects a sensitivity difference between a signal generated by adding the signal read out from the four pixels by the signal adding unit by the first control and a signal obtained by adding signals read out from the two pixels by the signal adding unit by the second control.

7. The imaging device of claim 5, wherein if n≥2, the control unit performs the first control on some of the pixel rows between the phase difference pixel rows which are adjacent in the column direction, in each of two pixel groups.

8. The imaging device of claim 1, wherein a BG pixel row included in the pixel group includes the phase difference pixel row.

9. An imaging method which uses a solid-state imaging element including a plurality of pixels which is two-dimensionally arranged,
wherein the solid-state imaging element includes a pixel group in which a red pixel that detects red light, a green pixel that detects green light, and a blue pixel that detects blue light are arranged in a Bayer pattern,
in the pixel group arranged in the Bayer pattern, two types of pixel rows, that is, a GR pixel row in which the green pixel and the red pixel are alternately arranged in parallel in a row direction and a BG pixel row in which the blue pixel and the green pixel are alternately arranged in parallel in the row direction are alternately arranged in parallel in a column direction which is perpendicular to the row direction,
the GR pixel rows or the BG pixel rows which are included in the pixel group arranged in the Beyer pattern includes a plurality of phase difference pixel rows which includes phase difference pixels for detecting a phase difference,
the phase difference pixel rows are arranged at an interval of $(2^{n+1}-1)$ (n is a natural number) pixel rows in the pixel group arranged in the Beyer pattern,
a control step which performs first control or second control on the same type of plural pixel rows as the phase difference pixel rows which are arranged in parallel in the column direction at regular intervals is provided,
pixel rows on which the first control is performed and pixel rows on which the second control is performed are alternately arranged in parallel in the column direction, in the first control, a signal is not read out from each pixel of the pixel rows to be controlled but a signal is read out from each pixel of two pixel rows which are adjacent to the pixel row to be controlled,
in the second control, a signal is read out from each pixel of the pixel row to be controlled,
the same type of plural pixel rows which are arranged in the column direction at the regular intervals include all phase difference pixel rows included in the solid-state imaging element and at least a pixel row which is in a middle between the phase difference pixel rows which are adjacent in the column direction, and in the control step, the first control is performed at least on the phase difference pixel rows.

10. The imaging method of claim 9, further comprising:
a signal adding step of generating a signal obtained by adding signals read out from two same color pixels which are adjacent in the column direction, in two pixel rows which are adjacent to the pixel rows on which the first control is performed.

11. The imaging method of claim 10, further comprising:
a sensitivity difference correcting step of correcting a sensitivity difference between the signals read by the second control and the signals which are read by the first control to be generated by the signal adding unit.

12. The imaging method of claim 9, wherein, if n≥2, in the control step, the first control is performed even on some of the pixel rows between the phase difference pixel rows which are adjacent in the column direction.

13. The imaging method of claim 9, wherein the solid-state imaging element includes two pixel groups,
a pixel that detects light with the same color as a pixel which is included in the other one of the two pixel groups is arranged to be adjacent to each pixel included in any one of two pixel groups in the same direction with respect to each pixel,
in the control step, the first control or the second control is performed on each of the plurality of pixel rows in each of the two pixel groups, and
a signal adding step of adding signals read out from four pixels from two same color pixels which are adjacent to the pixel of the pixel row on which the first control is performed in any one of the two pixel groups in the column direction and pixels which are included in the other one of the two pixel groups and are adjacent to the two same color pixels in the same direction and adding signals read out from two pixels of a pixel of the pixel row on which the second control is performed in one of the two pixel groups and a pixel which is included in the other one of the two pixel groups and is adjacent to the pixel in the same direction is further provided.

14. The imaging method of claim 13, further comprising:
a sensitivity difference correcting step of correcting a sensitivity difference between a signal obtained by adding the signal read out from the four pixels by the first control in the signal adding step and a signal obtained by adding signals read out from the two pixels by the second control in the signal adding step.

15. The imaging method of claim 13, wherein if n≥2, in the control step, the first control is performed on some of the pixel rows between the phase difference pixel rows which are adjacent in the column direction, in each of two pixel groups.

16. The imaging method of claim 9, wherein a BG pixel row included in the pixel group includes the phase difference pixel row.

* * * * *